United States Patent
Morioka et al.

(10) Patent No.: US 7,012,879 B2
(45) Date of Patent: Mar. 14, 2006

(54) OPTICAL DISC, REPRODUCTION APPARATUS, AND DISC IDENTIFIER SELECTING APPARATUS

(75) Inventors: Koichi Morioka, Katano (JP); Takashi Yumiba, Uji (JP); Keiichi Kawashima, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 10/989,004

(22) Filed: Nov. 16, 2004

(65) Prior Publication Data

US 2005/0088955 A1    Apr. 28, 2005

Related U.S. Application Data

(62) Division of application No. 09/832,960, filed on Apr. 12, 2001, now Pat. No. 6,901,042.

(30) Foreign Application Priority Data

Apr. 12, 2000    (JP) .............................. 2000-110257

(51) Int. Cl.
    *G11B 7/24*    (2006.01)

(52) U.S. Cl. ................................ 369/275.4; 369/53.31
(58) Field of Classification Search ..................... None
    See application file for complete search history.

(56) References Cited

U.S. PATENT DOCUMENTS

| | | |
|---|---|---|
| 5,696,757 A | 12/1997 | Ozaki et al. |
| 5,805,551 A | 9/1998 | Oshima et al. |
| 5,881,038 A | 3/1999 | Oshima et al. |

*Primary Examiner*—Paul W. Huber
(74) *Attorney, Agent, or Firm*—Wenderoth, Lind & Ponack, L.L.P.

(57) ABSTRACT

An optical disc includes a processed area that has been processed by the irradiation of a YAG laser. Concave pits and convex pits having a length 3T–14T (T=0.133 μm) are formed in an area of the optical disc other than the processed area. The processed area includes (1) a concave pit having a length X or (2) a pit string that has a length X and includes a convex pit from which a reflection layer has been removed. A specific area of the optical disc records physical character information that shows the location and length of the concave pit or the pit string in the processed area.

3 Claims, 22 Drawing Sheets

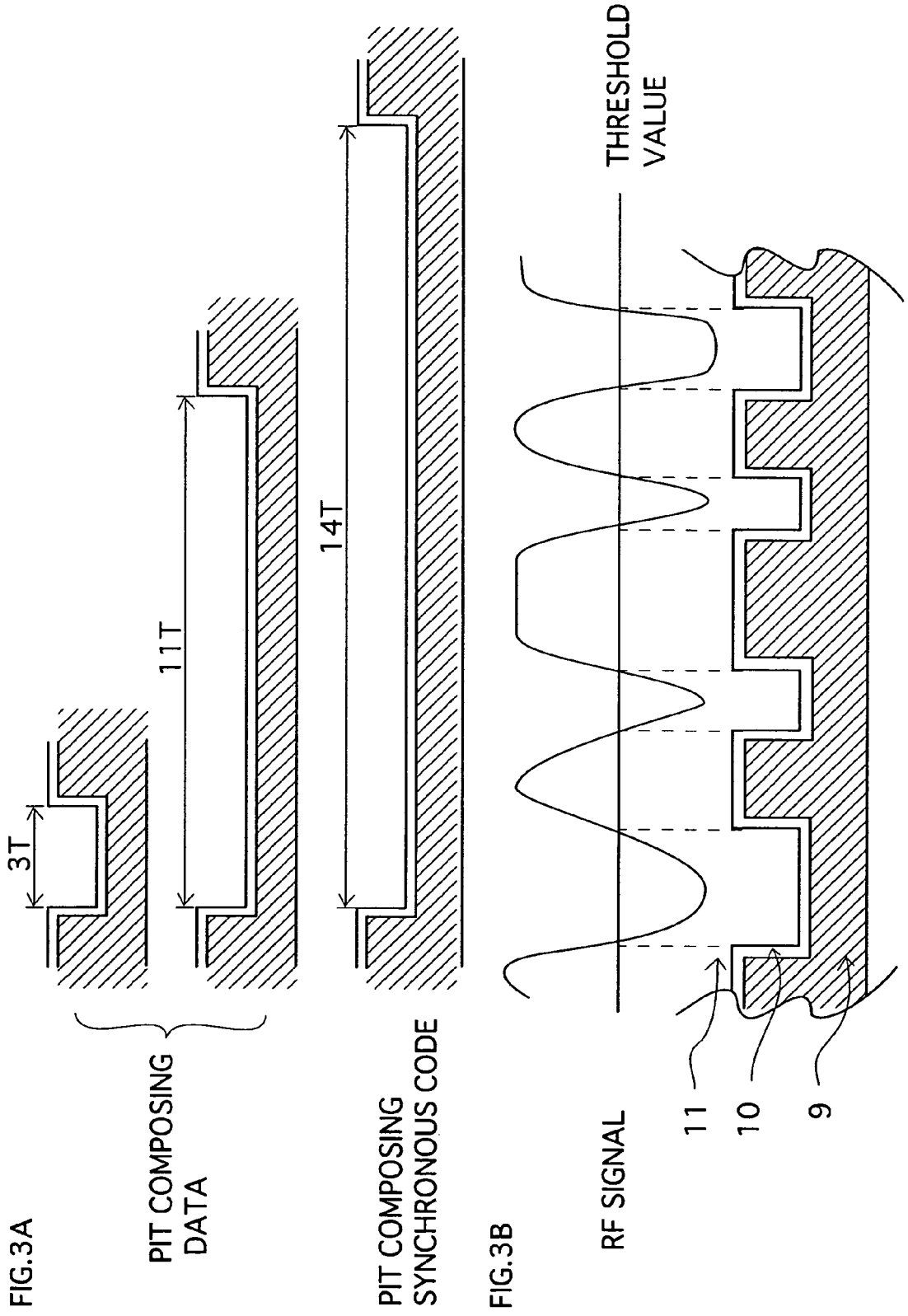

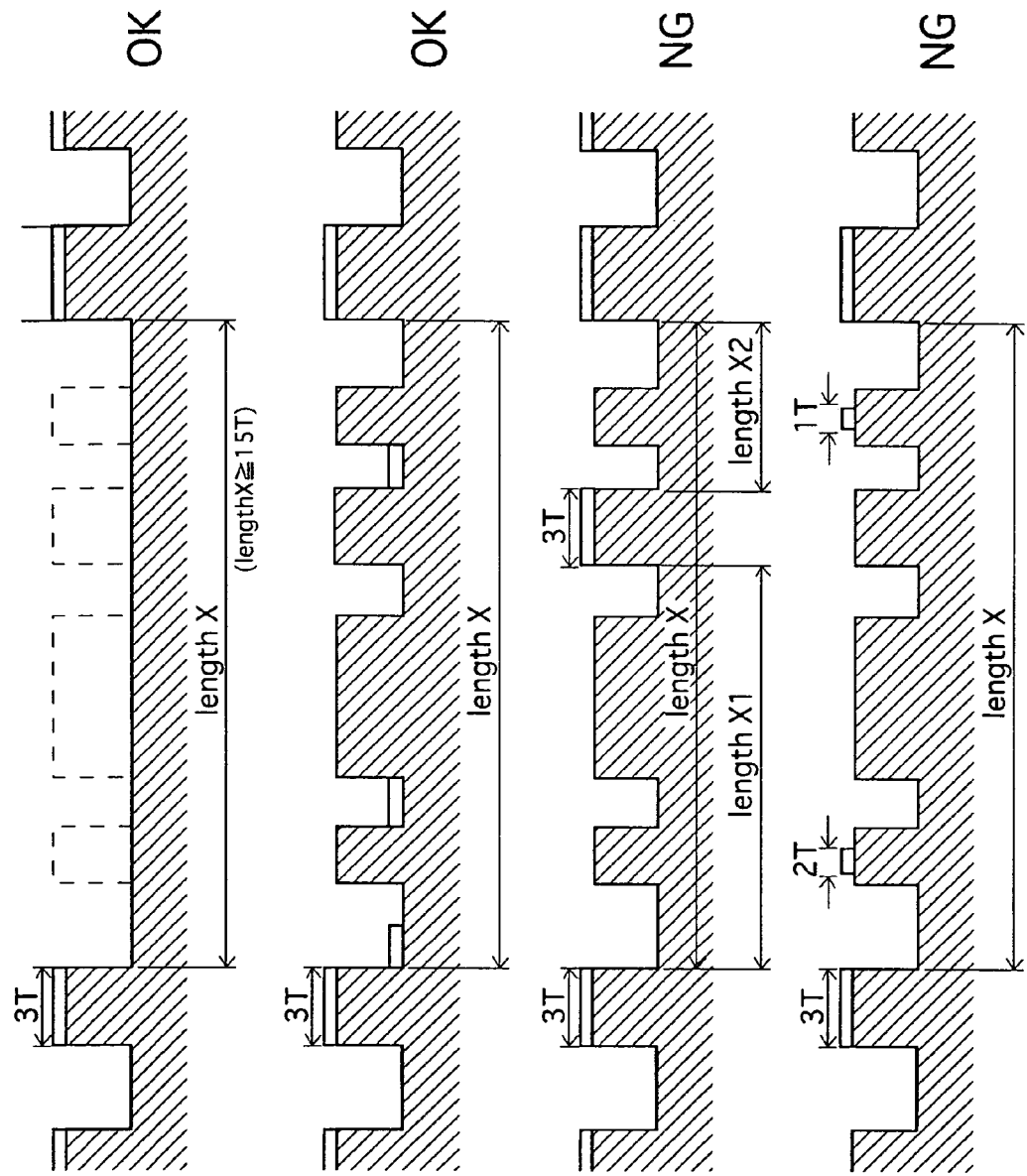

FIG.15A

PHYSICAL CHARACTER INFORMATION TABLE

|  | PHYSICAL CHARACTER INFORMATION COLUMN | OK/NG COLUMN |
|---|---|---|
| PROCESSED AREA 1 | PHYSICAL CHARACTER INFORMATION1<br>PHYSICAL CHARACTER INFORMATION2<br>PHYSICAL CHARACTER INFORMATION3<br>⋮<br>PHYSICAL FEATURE INFORMATION Y | —<br>—<br>—<br>⋮<br>— |
| PROCESSED AREA 2 | PHYSICAL CHARACTER INFORMATION1<br>PHYSICAL CHARACTER INFORMATION2<br>PHYSICAL CHARACTER INFORMATION3<br>⋮<br>PHYSICAL CHARACTER INFORMATION Y | —<br>—<br>—<br>⋮<br>— |
| ⋮ | ⋮ | ⋮ |
| PROCESSED AREA N | PHYSICAL CHARACTER INFORMATION1<br>PHYSICAL CHARACTER INFORMATION2<br>PHYSICAL CHARACTER INFORMATION3<br>⋮<br>PHYSICAL CHARACTER INFORMATION Y | —<br>—<br>—<br>⋮<br>— |

FIG.15B

PHYSICAL CHARACTER INFORMATION TABLE

|  | PHYSICAL CHARACTER INFORMATION COLUMN | OK/NG COLUMN |
|---|---|---|
| PROCESSED AREA 1 | PHYSICAL CHARACTER INFORMATION1<br>PHYSICAL CHARACTER INFORMATION2<br>PHYSICAL CHARACTER INFORMATION3<br>⋮<br>PHYSICAL CHARACTER INFORMATION Y | NG<br>NG<br>NG<br>⋮<br>NG |
| PROCESSED AREA 2 | PHYSICAL CHARACTER INFORMATION1<br>PHYSICAL CHARACTER INFORMATION2<br>PHYSICAL CHARACTER INFORMATION3<br>⋮<br>PHYSICAL CHARACTER INFORMATION Y | NG<br>NG<br>NG<br>⋮<br>NG |
| ⋮ | ⋮ | ⋮ |
| PROCESSED AREA 6 | PHYSICAL CHARACTER INFORMATION1<br>PHYSICAL CHARACTER INFORMATION2<br>⋮<br>PHYSICAL CHARACTER INFORMATION5<br>⋮<br>PHYSICAL CHARACTER INFORMATION Y | NG<br>NG<br>⋮<br>OK<br>⋮<br>NG |

FIG.16A
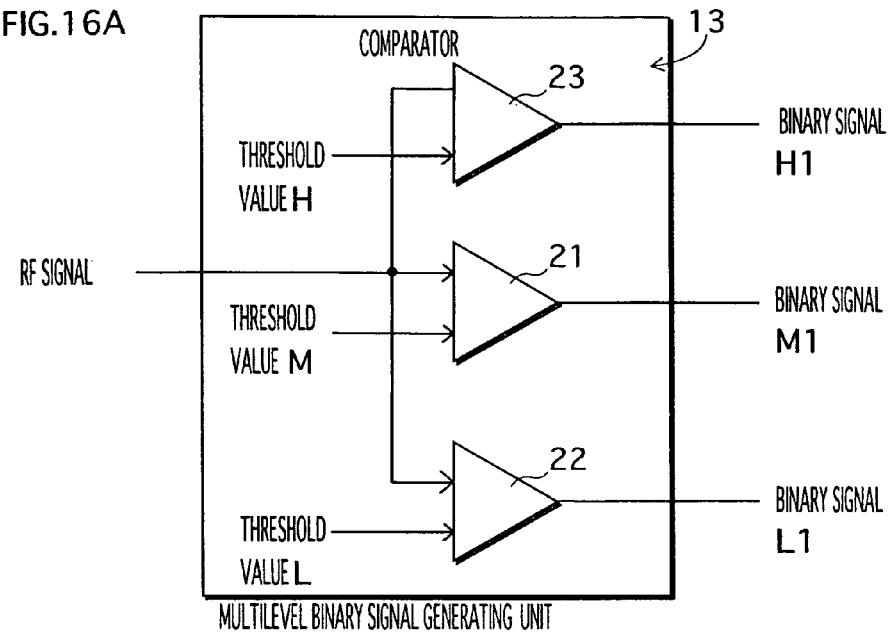
FIG.16B
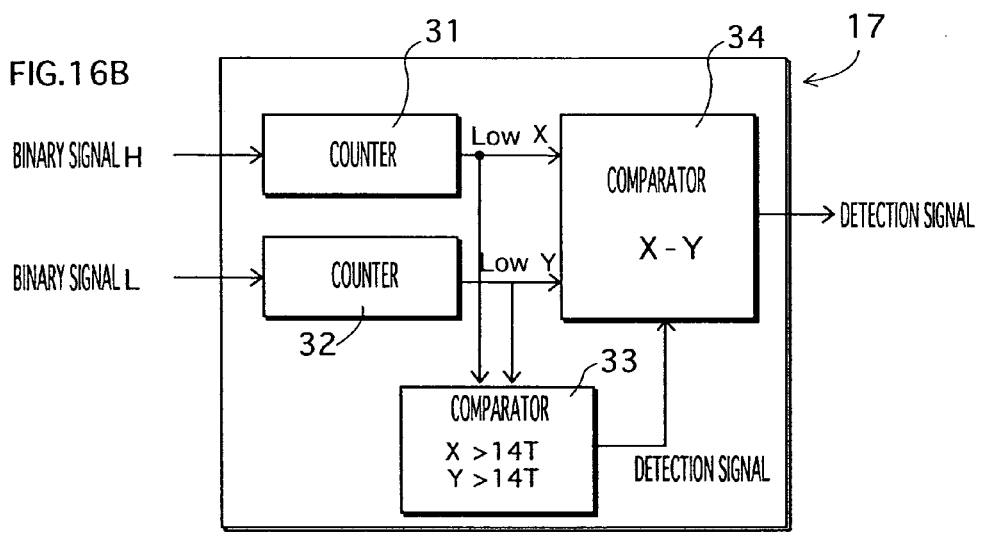
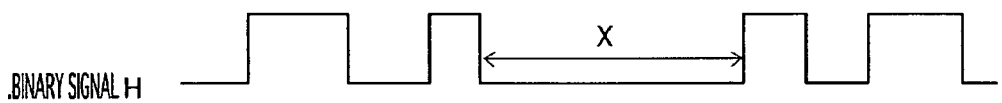
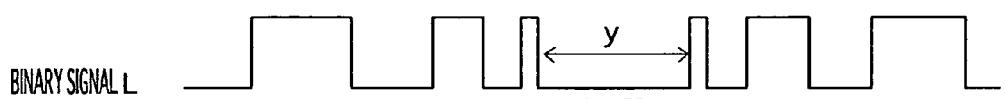

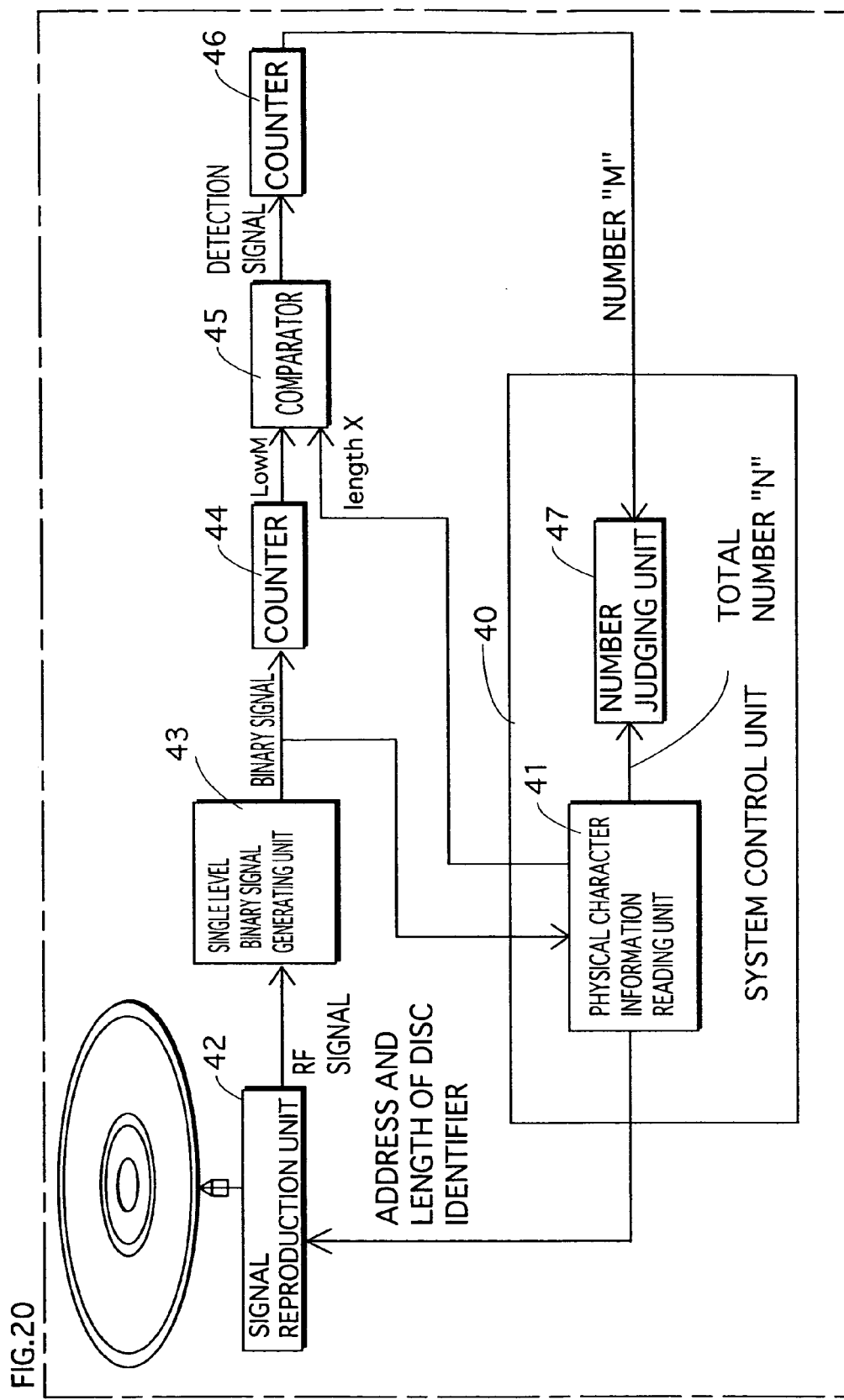

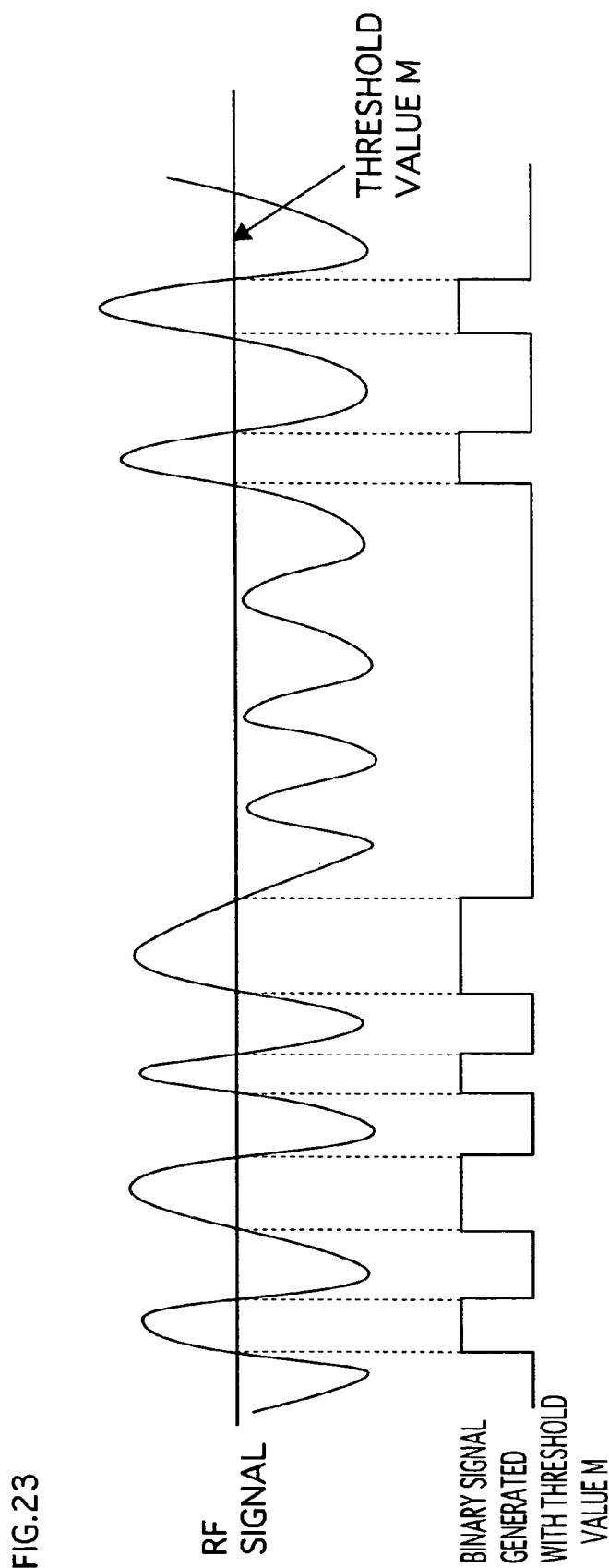

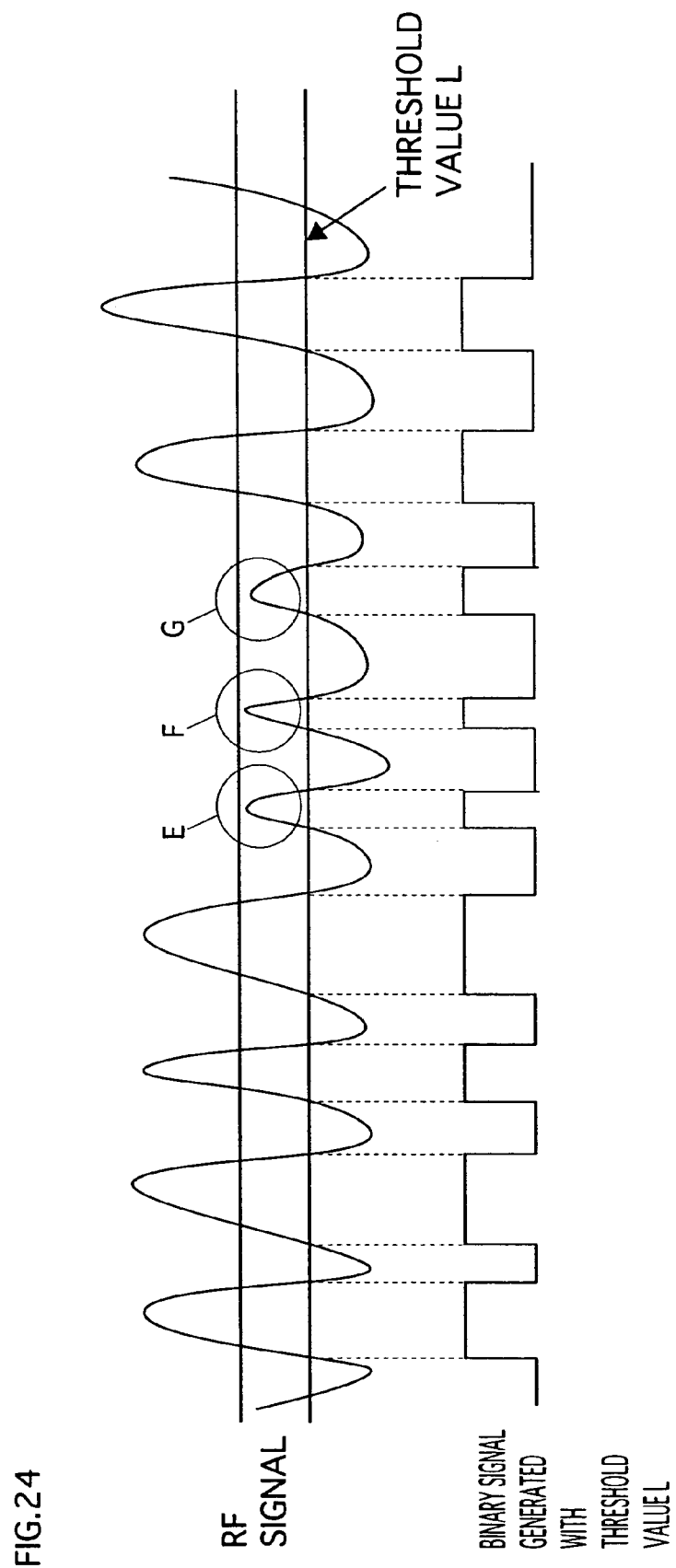

OPTICAL DISC, REPRODUCTION APPARATUS, AND DISC IDENTIFIER SELECTING APPARATUS

This application is a divisional application of Ser. No. 09/832,960, filed Apr. 12, 2001 is now U.S. Pat. No. 6,901,042.

BACKGROUND OF THE INVENTION

1. Field of the Invention

The present invention relates to an optical disc, a reproduction apparatus, and a disc identifier selecting apparatus. The present invention also relates to an improvement in securing a copyright on data recorded on an optical disc.

2. Description of the Related Art

Manufacturers who record digital copyrighted materials, such as game software and movies, on optical discs pay great attention to the prevention of casual copying by ordinary users. The casual copying refers to user's operations where the users interconnect personal computers with commercially available reproduction apparatuses and recording apparatuses, read data from optical discs, such as CD-ROMs and DVD-ROMs, and write the read data on rewritable discs, such as hard disks CD-Rs, and DVD-Rs. As can be seen from this, the casual copying does not require specialized equipment and so it is possible for the users to perform the casual copying. If the casual copying is performed by many users, the optical disc industry will suffer great economical losses. Therefore, the manufacturers exert their best efforts to prevent the casual copying by processing digital copyrighted materials before recording the materials on optical discs. For instance, the digital copyrighted materials are encrypted using identification information unique to the optical discs.

Although having been effective until now, it cannot be ensured that this countermeasure will also be effective from now on because of the recent remarkable development in reverse techniques with which processes for encrypting the digital copyrighted materials are analyzed. If an analyzing program that analyzes the encryption processes and decrypts encrypted materials is developed and distributed to the ordinary users, the users can copy the digital copyrighted materials with a system composed of personal computers on which the analyzing program has been installed and commercially available reproduction apparatuses and recording apparatuses. As is understood from this, the emergence of the analyzing program makes it impossible to prevent the casual copying with the currently used technique. This means that the currently used technique of securing copyrights on digital copyrighted materials cannot be said as a complete countermeasure against the casual copying.

SUMMARY OF THE INVENTION

The object of the present invention is therefore to provide an optical disc that effectively prevents casual copying without using a technique where a digital copyrighted material is processed (encrypted, for instance) before being recorded on an optical disc.

The above object is achieved by an optical disc including: a data area in which a data pit string corresponding to recorded digital data is formed, the data pit string including concave parts, convex parts, and a certification pit, the certification pit certifying that the recorded digital data is original, where a length of each of the concave parts and convex parts satisfies a predetermined rule, and a length of the certification pit does not satisfy the predetermined rule.

With this construction, the length of the certification pit does not satisfy the predetermined rule. Therefore, without special modifications, a commercially available recording apparatus cannot copy the certification pit to a rewritable disc along with the data pit string. Before the reproduction of an optical disc, a reproduction apparatus of the present invention checks whether a certification pit exists on the optical disc. In this manner, the reproduction apparatus judges whether the optical disc is a legitimate optical disc on which a digital copyrighted material has been recorded by an authorized manufacturer or an illegitimate rewritable disc on which a digital copyrighted material has been recorded by casual copying. If the optical disc is judged as an illegitimate rewritable disc, the reproduction apparatus does not reproduce the optical disc. On the other hand, if the optical disc is judged as a legitimate optical disc, the reproduction apparatus reproduces the optical disc.

Here, the predetermined rule may be based on a run length limitation method that encodes the digital data so that a zero bit sequence is obtained, a total number of zero bits in the zero bit sequence being within a range from a first number of zero bits to a second number of zero bits. Also, the length of each of the concave parts and convex parts may be within a range from a first length to a second length, the first length and the second length respectively corresponding to the first number and the second number. Further, the certification pit may be a concave part or a convex part, the length of the concave part or the convex part being less than the first length. With this construction, even if the certification pit is read with an optical pickup and an RF signal is obtained, the RF signal includes insufficient peak and bottom levels. Before recording such an RF signal on a rewritable disc, a commercially available recording apparatus corrects the insufficient peak and bottom levels and converts the corrected RF signal into a binary signal. Therefore, even if the recording apparatus records the binary signal on a hard disk, a CD-R, DVD-R, or the like, such a disc is not recognized as a legitimate optical disc.

Here, the predetermined rule may be based on a run length limitation method that encodes the digital data so that a zero bit sequence is obtained, a total number of zero bits in the zero bit sequence being within a range from a first number to a second number. Also, the length of each of the concave parts and convex parts may be within a range from a first length to a second length, the first length and the second length respectively corresponding to the first number and the second number. Further, the certification pit maybe a concave part, the length of the concave part exceeding the second length. With this construction, the certification pit has a length exceeding the second length. Therefore, without special modifications, a commercially available recording apparatus cannot copy the certification pit having this length to a rewritable disc along with the data pit string composed of concave pits and convex pits having a length within the range from the first length to the second length. Also, the RF signal obtained by reading the certification pit includes a low section that is longer than any low section of an RF signal obtained by reading the data pit string in the data area. This allows the reproduction apparatus of the present invention to judge whether an optical disc to be reproduced is a legitimate optical disc produced by an authorized manufacturer merely by counting the length of each low section.

The above object is also achieved by an optical disc including: a processed area that has been processed with a laser, where an area of the optical disc other than the processed area includes concave parts and convex parts, each of which has a length within a range from a first length to a second length and is coated with a reflection layer, and the processed area includes a first concave part or a first pit string, the first concave part having a length exceeding the second length, and the first pit string having a length exceeding the second length and including concave parts and uncoated convex parts from which the reflection layer is removed. With this construction, the certification pit certifying that the optical disc is legitimate is formed merely by processing a certain area of the optical disc with a laser. Therefore, the certification pit is formed on the optical disc at low cost.

Here, the optical disc may further include a specific area, where the processed area further includes a second pit string that has a length exceeding the second length and includes a convex part on which a reflection layer having a length less than the first length exists, the first concave part or the first pit string is distinguished from the second pit string by comparing a level of an RF signal obtained from the processed area with a first threshold value and a second threshold value, and the specific area records information showing a location and a length of the first concave part or the first pit string. With this construction, the specific area records the information showing the location and length of the first concave pit or the first pit string including the uncoated convex pit. Therefore, the information in the specific area does not show the location and length of each convex pit on which the reflection layer remains. This allows the reproduction apparatus of the present invention to judge whether an optical disc to be reproduced is legitimate with more precision.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 3A shows example lengths of pits formed in a data area;

FIG. 3B shows an RF signal obtained by irradiating laser light onto a pit string in the data area;

FIG. 10A shows a track shape where a single concave pit having a length X is formed;

FIG. 10B shows a track shape where a pit string has a length X and a reflection layer is removed from convex pits in the pit string;

FIG. 10C shows a track shape where a pit string includes a convex pit on which a reflection layer having a length of at least 3T remains;

FIG. 10D shows a track shape where a pit string includes convex pits, on each of which a reflection layer having a length less than 2T remains;

FIG. 15A shows a physical character information table that gives physical character information for Y tracks in each processed area;

FIG. 15B shows a state of the physical character information table where a disc identifier setting unit has set a sign OK or NG for each piece of physical character information;

FIG. 16A shows the internal construction of a multilevel binary signal generating unit;

FIG. 16B shows the internal construction of a disc identifier selecting unit;

FIG. 10B is read with an optical pickup;

FIG. 20 shows the internal construction of a reproduction apparatus of the second embodiment;

FIG. 23 shows a state before a threshold value M is changed to a threshold value L by a reproduction apparatus of the third embodiment; and FIG. 24 shows a state after the threshold value M is changed to the threshold value L by the reproduction apparatus of the third embodiment.

DESCRIPTION OF THE PREFERRED EMBODIMENTS

The following is a description of embodiments of an optical disc, a disc identifier selecting apparatus, and a reproduction apparatus of the present invention.

<First Embodiment>

Figure 1:
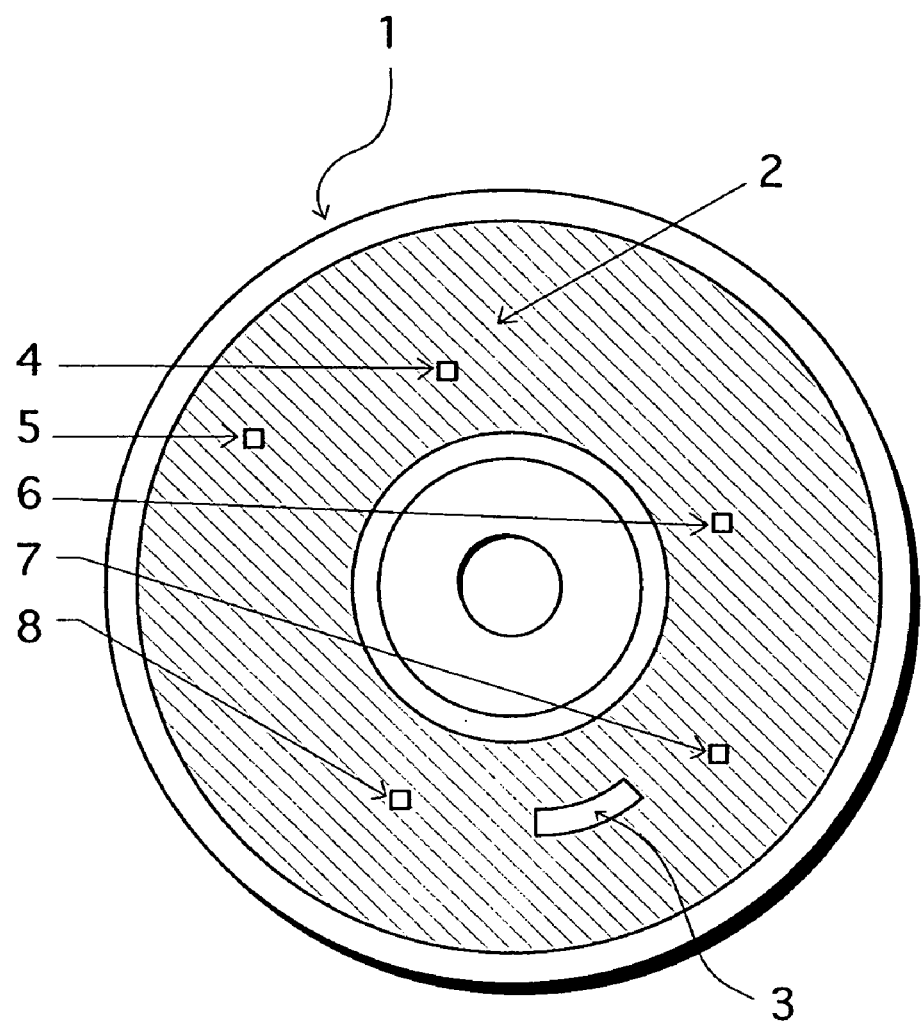
FIG. 1 shows the appearance of an optical disc of the first embodiment.

FIG. 1 shows the appearance of an optical disc 1 of the present embodiment. The recording area of the optical disc 1 is broadly divided into two areas: a data area 2 that records digital data including digital copyrighted materials, and a specific area 3. The data area 2 includes N (=5) processed areas 4–8 that have been processed to protect a copyright on the digital copyrighted material.

Figure 2A:
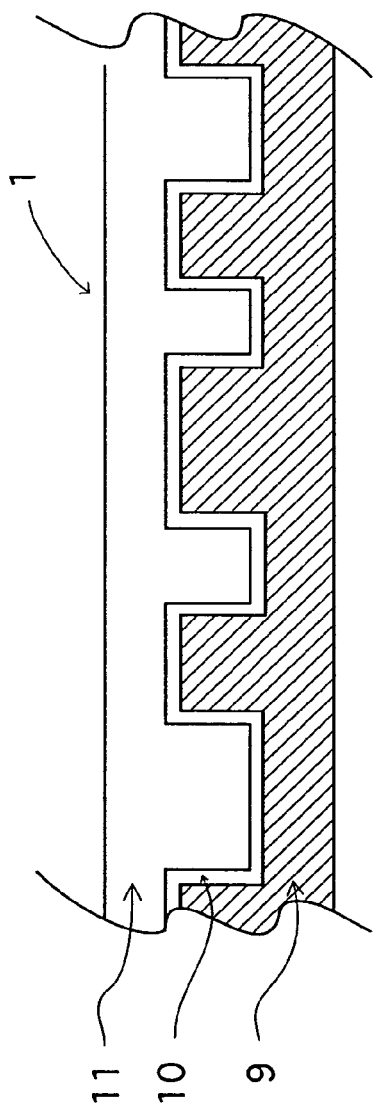
FIG. 2A is a cross sectional view of the optical disc.

FIG. 2A is a cross sectional view of the optical disc 1. As shown in this drawing, the optical disc 1 includes a substrate 9 on which pits (concave pits and convex pits) are formed, a reflection layer 10 formed with an aluminum vapor deposition method, and a protection layer 11 made of a transparent material to protect the substrate 9 and the reflection layer 10. The substrate 9 includes a pit string (a sequence of concave pits and convex pits).

Figure 2B:
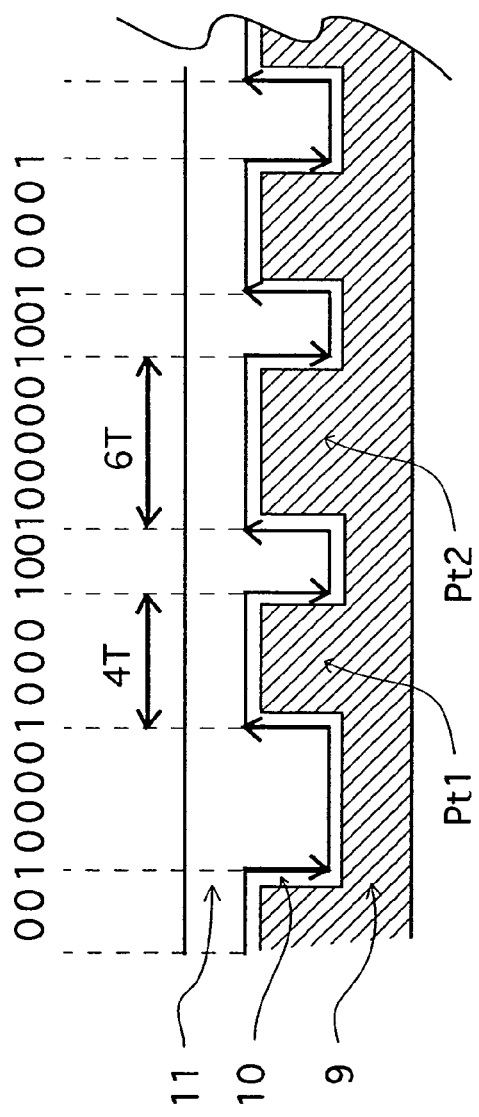
FIG. 2B shows the correspondences between (a) concave pits and convex pits and (b) bits "1" and bits "0"

FIG. 2B shows the correspondences between (1) concave pits and convex pits and (2) a bit string (a sequence of bits "1" and "0") used during recording. It should be noted here that each interval between the bits "1" is represented using a unit "T" in this specification. As shown in this drawing, the bit string is recorded as pits. During the recording, a pit reversal (each edge specified by an arrow "↓" or "↑" in the drawing) is caused each time a bit "0" is switched to a bit "1". The length of each concave pit or convex pit can be expressed using an interval T between the bits "1". In the example shown in FIG. 2B, the length of a convex pit pt1 is 4T and that of a convex pit pt2 is 6T. In general, the maximum interval between pit reversals is regulated so as to reduce the low frequency component of a reproduction signal obtained from a disc, and the minimum interval between the pit reversals is regulated so as to prevent the reproduction signal from becoming a high band signal. To meet these conditions, in this embodiment, data obtained by processing original digital data with an 8/16 modulation method is used as a bit string and a pit reversal is caused each time a bit "0" is switched to a bit "1" during recording. Here, the 8/16 modulation method is known as a coding method adopted by a DVD technology and converts 8-bit data composing digital data into 16-bit data using a predetermined conversion table. Needless to say, an EFM (Eight to Fourteen Modulation) method that converts 8-bit data composing digital data into 14-bit data may be used instead of the 8/16 modulation method. With the 8/16 modulation method, 8-bit data composing original digital data is converted into 16-bit data where bits are arranged so that two-ten bits "0" are sandwiched between two bits "1" ("1001"-"1 0000 0000 00 1"). This means that the length of each concave pit or convex pit is within a range from 3T to 11T. The 16-bit data obtained with the 8/16 modulation method is given a synchronous code and is recorded on an optical disc.

The synchronous code includes a pattern "1 0000 0000 0000 01", which is not obtained with the 8/16 modulation method, and is distinguished from original digital data. Because this pattern corresponds to a pit having a length 14T, digital data is recorded on an optical disc as a sequence of concave pits and convex pits, each of which has a length 3T–14T. FIG. 3A shows example lengths of concave pits and convex pits formed in the data area.

Figure 4:
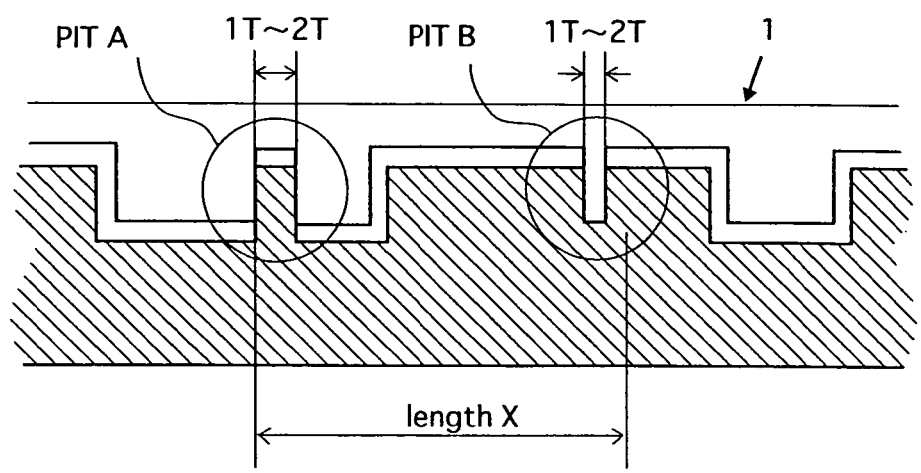
FIG. 4 shows a convex pit A and a concave pit B having a length 1T–2T.

The concave pits and convex pits in the data area 2 are irradiated with laser light and an RF (Radio Frequency) signal, shown in FIG. 3B, is obtained by electrically converting a reflection light obtained by the irradiation. In general, an RF signal is obtained by electrically converting a reflection light into an electric signal and by equalizing the amplitude of the electric signal. The RF signal is converted into a binary signal using a threshold value M and the binary signal is subjected to 8–16 demodulation processing and error correction processing. In this manner, data composing a digital copyrighted material is obtained. Next, the processed areas 4–8 are described. FIG. 4 shows concave pits and convex pits formed in the processed area 6. In this drawing, the processed area 6 has a construction where a convex pit A and a concave pit B, each of which has a length 1T–2T, are arranged with a distance "length X" therebetween. The concave pit and convex pit can be easily formed with a recording waveform that is shorter than that regulated during the production of the optical disc. The lengths (1T–2T) of these pits are shorter than those (3T–14T) of normal pits. Therefore, during the reading with an optical pickup, the RF signal obtained from the convex pit A and concave pit B does not have enough high and low levels, unlike the RF signal obtained from the normal pits. Especially note that such an RF signal that does not have enough high and low levels cannot be reproduced by a commercially available reproduction apparatus and cannot be copied to another optical disc by a commercially available recording apparatus. This is because the commercially available reproduction apparatus reads concave pits and convex pits having a length 3T–14T from an optical disc and the commercially available recording apparatus records concave pits and convex pits having a length 3T–14T on a rewritable disc. When a RF signal is obtained from concave pits and convex pits having a length shorter than a normal pit length, the commercially available reproduction apparatus and recording apparatus regard the RF signal as an irregular RF signal and converts it into a regular RF signal by performing error correction processing during reproduction and recording. As a result, the concave pit and convex pit having a length 1T–2T are not copied to a rewritable disc by casual copying.

The presence of a concave pit and a convex pit having a length 1T–2T on an optical disc certifies that the optical disc is an original optical disc produced by an authorized manufacturer. A pit string, in which a concave pit and a convex pit having a length 1T–2T are arranged with a distance "length X"therebetween, is referred to as a "disc identifier" in this embodiment. A reproduction apparatus produced by an authorized manufacturer reads a disc identifier from an optical disc to be reproduced and checks the distance between a concave pit and a convex pit having a length 1–2T. According to the check result, the reproduction apparatus judges whether the optical disc to be reproduced is a legitimate optical disc or a rewritable disc to which a digital copyrighted material is illegally copied by casual copying. The processed area 6 of the first embodiment has been described above. The following description concerns the specific area 3 of the first embodiment.

The specific area 3 records physical character information that shows physical characters of the disc identifier formed in the processed area. More specifically, the physical character information shows a distance between the concave pit and convex pit having the length 1T–2T and a location of the disc identifier on the optical disc. Because physical character information concerning the disc identifier is recorded in the specific area 3, a legitimate reproduction apparatus finds the location of the disc identifier on the optical disc by referring to the physical character information. Also, because the physical character information gives the distance between the concave pit and convex pit having the length 1T–2T (the length of the disc identifier), the reproduction apparatus can find the distance between the concave pit and convex pit in the disc identifier.

Figure 5:
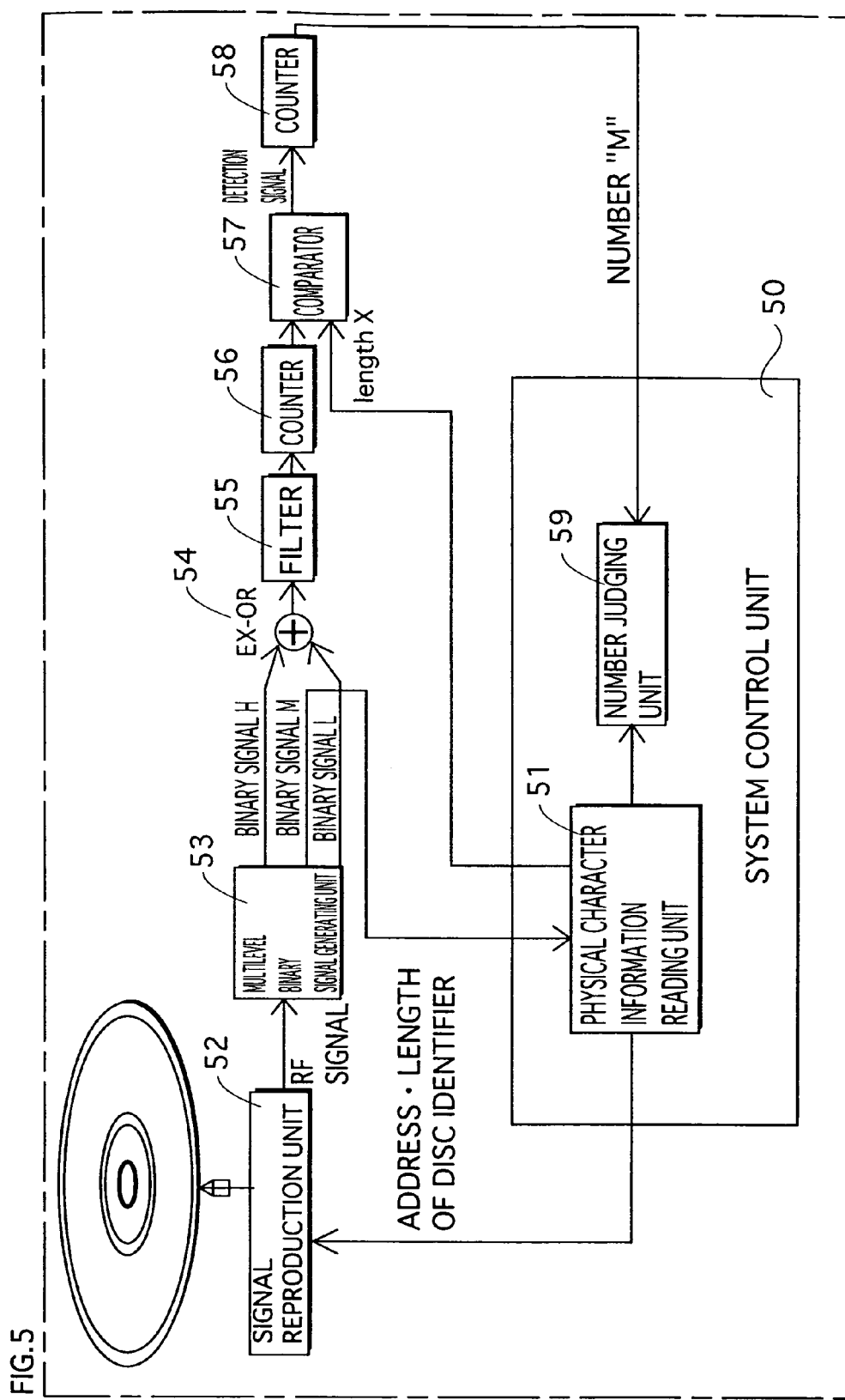
FIG. 5 shows the internal construction of a reproduction apparatus of the first embodiment.

The following description concerns a reproduction apparatus of the first embodiment that reproduces the optical disc 1. FIG. 5 shows the internal construction of the reproduction apparatus of the present embodiment. As shown in this drawing, the reproduction apparatus includes a system control unit 50 (including physical character information reading unit 51 and a number judging unit 59), a signal reproduction unit 52, a multilevel binary signal generating unit 53, an EX-OR calculation unit 54, a filter 55, a counter 56, a comparator 57, and a counter 58.

The system control unit 50 includes a CPU, a memory, and a program stored in the memory, and takes overall control of the reproduction apparatus.

The physical character information reading unit 51 operates as follows, when an optical disc is placed in the reproduction apparatus and an instruction to reproduce the optical disc is input. The physical character information reading unit 51 reads N pieces of physical character information from the specific area 3 and instructs the signal reproduction unit 52 to read concave pits and convex pits on the optical disc according to the location and length shown by each piece of physical character information.

Figure 6:
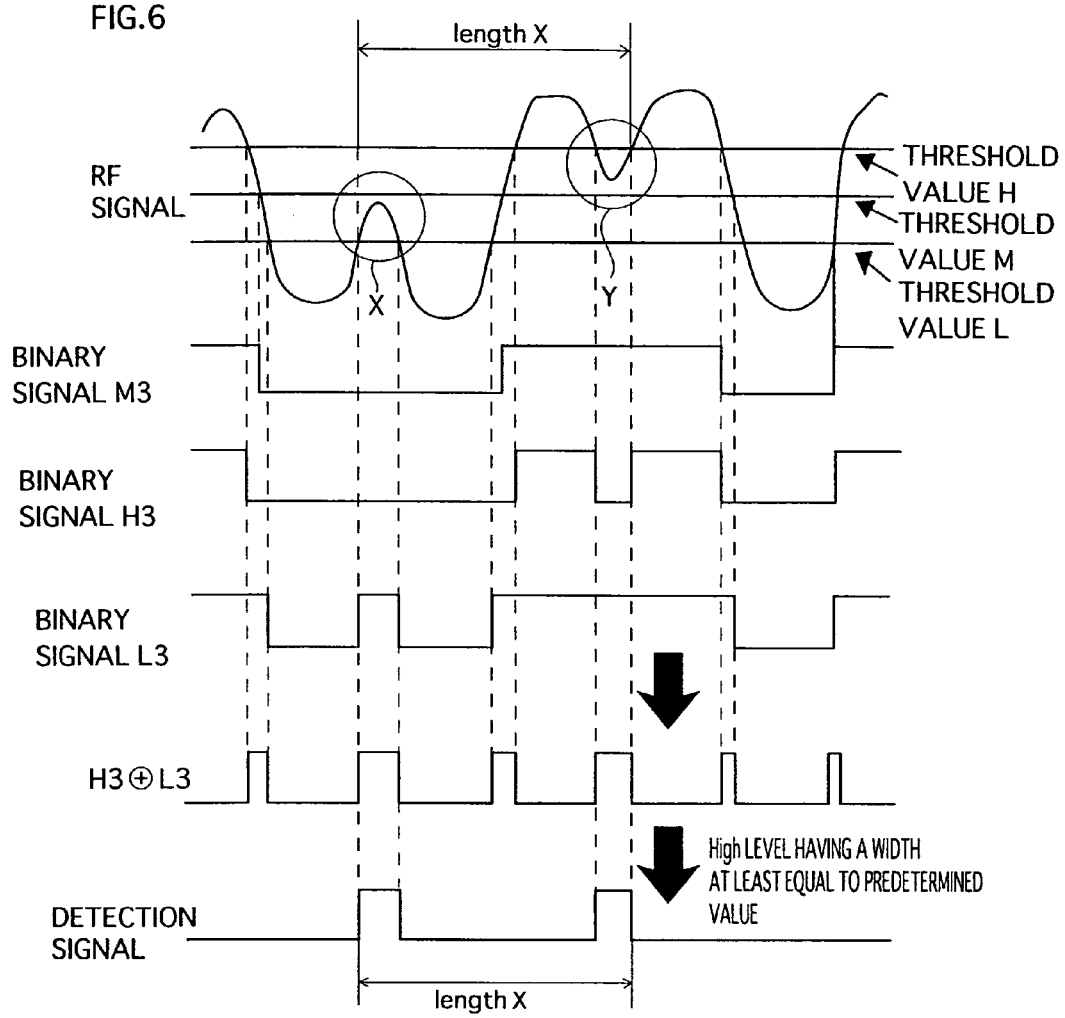
FIG. 6 shows an RF signal, binary signals M, H, and L, a calculation result obtained by an EX-OR calculation circuit, and a detection signal.

The signal reproduction unit 52 includes an optical pickup and obtains an RF signal by irradiating laser light onto the concave pits and convex pits on the optical disc and receiving reflection light. FIG. 6 shows an example of the RF signal that is obtained when the pit string shown in FIG. 4 is read. Because each of the convex pit A and concave pit B has a length less than 2T, the reflection light obtained by irradiating laser light onto these pits does not have high enough brightness and darkness levels. Therefore, as shown on the first level in FIG. 6, the RF signal obtained from the reflection light includes peaks X and Y that do not have high enough amplitude levels.

The multilevel binary signal generating unit 53 converts the RF signal into binary signal using threshold values M, L, and H. The first level in FIG. 6 shows the correspondences between the RF signal and the threshold values M, L, and H. The second level in FIG. 6 shows a binary signal M3 obtained from the RF signal using the threshold value M. The third level in FIG. 6 shows a binary signal H3 obtained from the RF signal using the threshold value H. The fourth level in FIG. 6 shows a binary signal L3 obtained from the RF signal using the threshold value L.

The binary signal M3 obtained using the threshold value M includes no high section corresponding to the peak X and no low section corresponding to the peak Y. The binary signal H3 obtained using the threshold value H does not include a high section corresponding to the peak X, but includes a low section corresponding to the peak Y. The binary signal L3 obtained using the threshold value L includes a high section corresponding to the peak X, but does not include a low section corresponding to the peak Y.

The EX-OR calculation unit 54 obtains a signal shown on the fifth level in FIG. 6 by calculating an exclusive OR of the binary signal H3 (on the third level in FIG. 6) and the binary signal L3 (on the fourth level in FIG. 6).

The filter 55 only passes each high level portion, which has a time length at least equal to a predetermined value, of the signal generated by the EX-OR calculation unit 54. As a result, a detection signal shown on the sixth level in FIG. 6 is obtained.

The counter 56 counts the time length of a low section, which is sandwiched between high sections corresponding to the peaks X and Y, of the detection signal output from the filter 55.

The comparator 57 judges whether the time length of the low section counted by the counter 56 is the same as that shown by the physical character information and, if so, outputs a detection signal to the counter 58.

The counter 58 counts the number M of detection signals output from the comparator 57.

The number judging unit 59 calculates a ratio M/N between the number N of pieces of physical character information in the specific area and the number M counted by the counter 58. The number judging unit 59 then compares the ratio M/N with a predetermined threshold value. If the ratio M/N exceeds the predetermined threshold value, the reproduction of the optical disc is allowed. If the ratio M/N does not exceed the predetermined threshold value, the reproduction of the optical disc is prohibited. Accordingly, even if the content of a legitimate optical disc is copied to a rewritable disc by casual copying and the rewritable disc is placed in the reproduction apparatus, the reproduction apparatus does not reproduce the rewritable disc.

As described above, the disc identifier of the optical disc of the present embodiment is recorded as concave pits and convex pits having a length 1T–2T, so that commercially available reproduction apparatus and recording apparatus cannot reproduce and record the disc identifier. The reproduction apparatus of the present embodiment judges whether an optical disc placed therein includes such a disc identifier to determine whether the optical disc is a legitimate optical disc on which a digital copyrighted material has been recorded by an authorized manufacturer or an illegitimate rewritable disc on which a digital copyrighted material has been recorded by casual copying.

Figure 7:
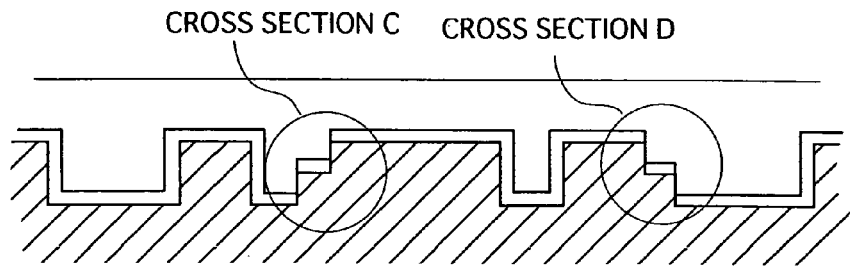
FIG. 7 shows concave pits having step-shaped cross sections C and D.
Figure 8:
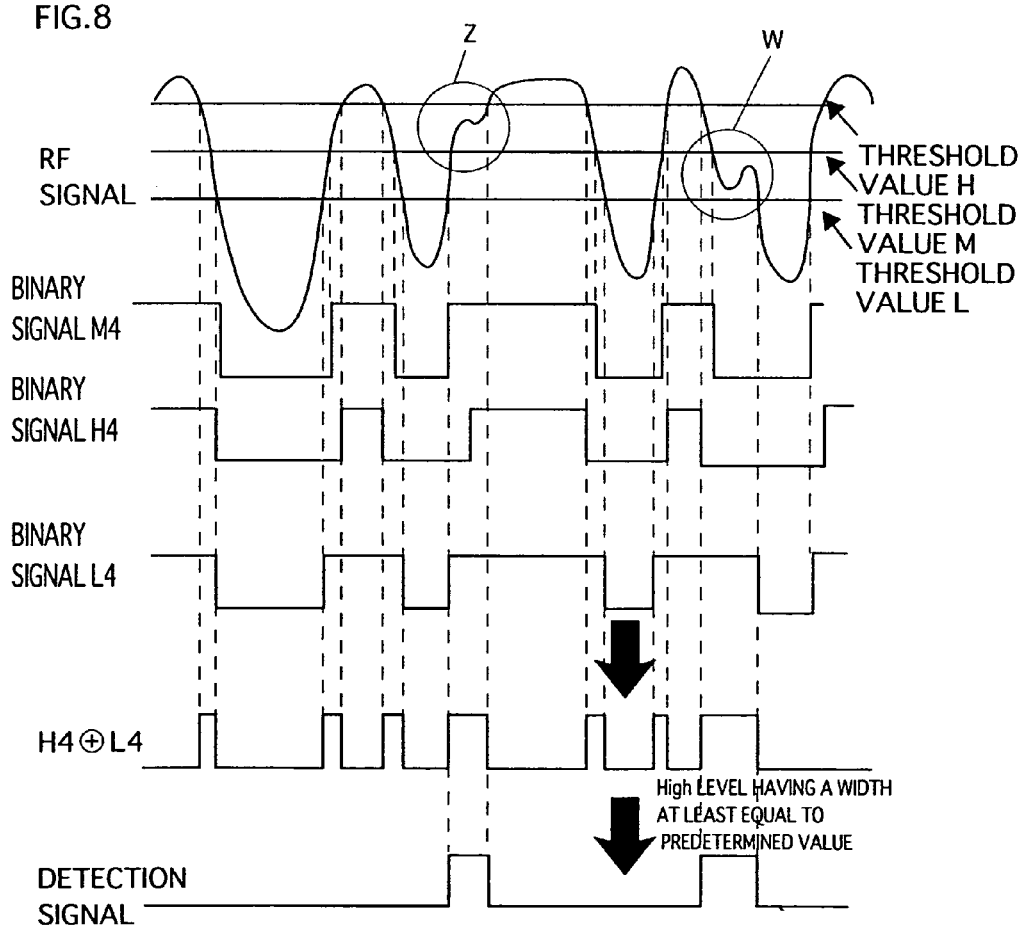
FIG. 8 shows an RF signal, binary signals M4, H4, and L4, a calculation result obtained by the EX-OR calculation circuit, and a detection signal.

It should be noted here that in the present embodiment, concave pits having step-shaped cross sections may be formed instead of the concave pits and convex pits having a length 1T–2T. FIG. 7 shows concave pits having step-shaped cross sections C and D. The height of each step in the cross sections C and D is set at the half of the depth of a concave pit. In general, if the wavelength of laser light is shown using a sign $\lambda$, the depth of a concave pit is expressed as $\lambda/4$. Therefore, the height of each step in the cross sections C and D is set at the half ($\lambda/8$) of the concave pit depth $\lambda/4$. These step-shaped cross sections C and D are formed by melting the aluminum reflection layer 10 and deforming the substrate 9 with the irradiation of a YAG (Yttrium, Aluminum, Garnet) laser onto the end portion of each desired concave pit having a normal length 3T–14T. The RF signal generated from a concave pit having such a step-shaped cross section has the same amplitude level as that obtained from a concave pit having a length less than 3T, and is detected in the same manner as the concave pit having the length less than 3T. FIG. 8 shows a process of converting an RF signal, which is obtained from concave pits having step-shaped cross sections and includes peaks Z and W, into binary signals. The first level in FIG. 8 shows the correspondences between the RF signal and the threshold values M, L, and H. The second level in FIG. 8 shows a binary signal M4 obtained from the RF signal using the threshold value M. The third level in FIG. 8 shows a binary signal H4 obtained from the RF signal using the threshold value H. The fourth level in FIG. 8 shows a binary signal L4 obtained from the RF signal using the threshold value L. The fifth level in FIG. 8 shows a signal obtained by the EX-OR calculation unit 54 that calculates an exclusive OR of the binary signals H4 and L4. The sixth level in FIG. 8 shows a detection signal output from the filter 55.

<Second Embodiment>

In the first embodiment, a disc identifier is recorded on an optical disc as concave pits and convex pits having a length 1T–2T. However, in the second embodiment, a disc identifier is recorded as a concave pit having a length at least equal to 15T.

First, a processed area of the present embodiment is described. This processed area is formed by the irradiation of a YAG laser.

Figure 9:
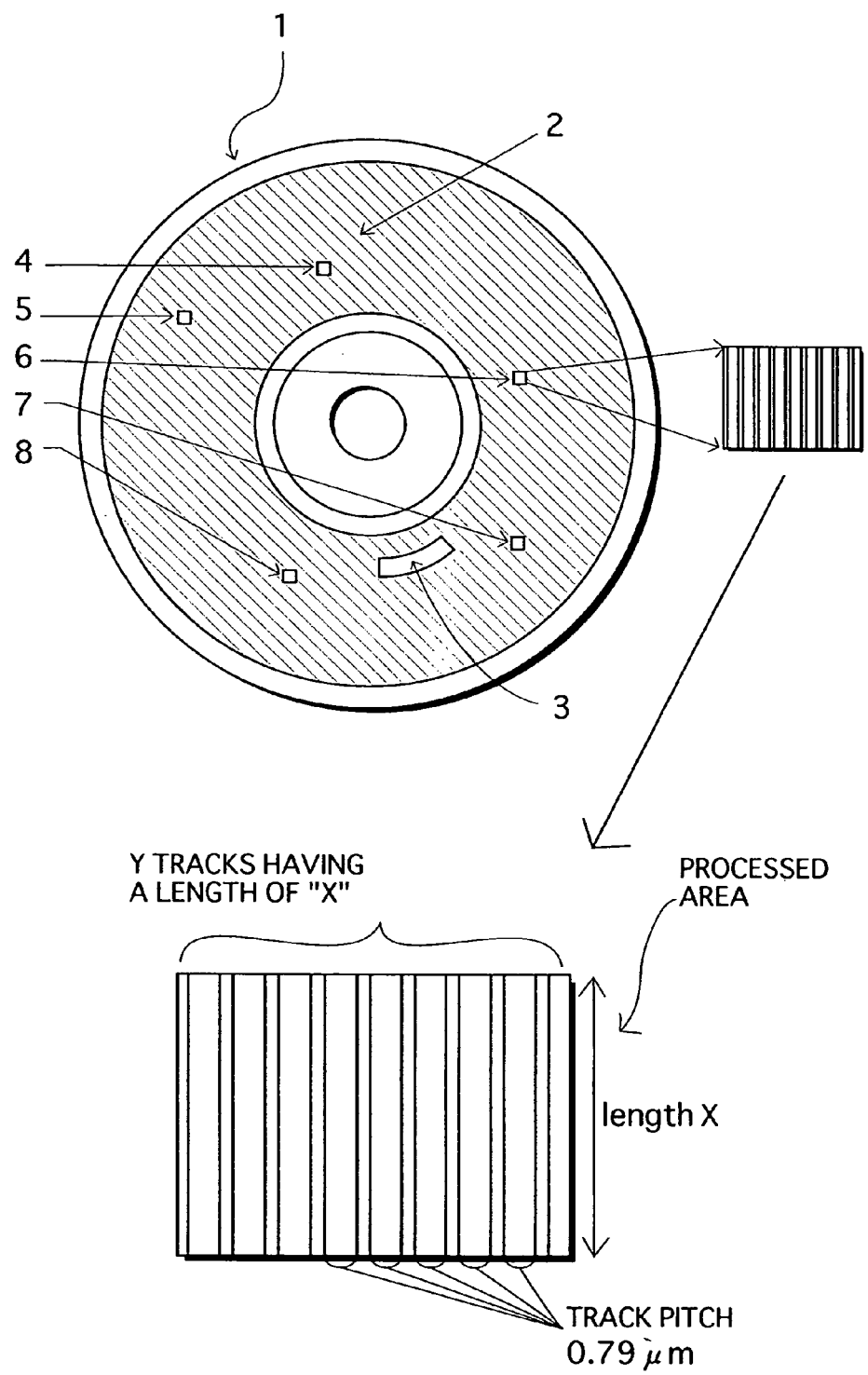
FIG. 9 is a magnified view of a processed area.

FIG. 9 is a magnified view of a processed area 6 of the present embodiment. In this drawing, the processed area 6 includes Y tracks having a length X, with each space between the tracks (a track pitch) being set at 0.79 μm and the size of the processed area being determined so that the error correction processing described above is performed by commercially available recording apparatus and reproduction apparatus. Each track in the processed area has one of four shapes shown in FIGS. 10A–10D. FIG. 10A shows a track shape where a single concave pit having a length X is formed (X=15T or more). Although convex pits having a length 3T–14T were originally formed in the processed area, the concave pit having the length X is formed by melting the original convex pits with the irradiation of a YAG laser (the broken lines represent the melted original convex pits in FIG. 10A).

Figure 11A:
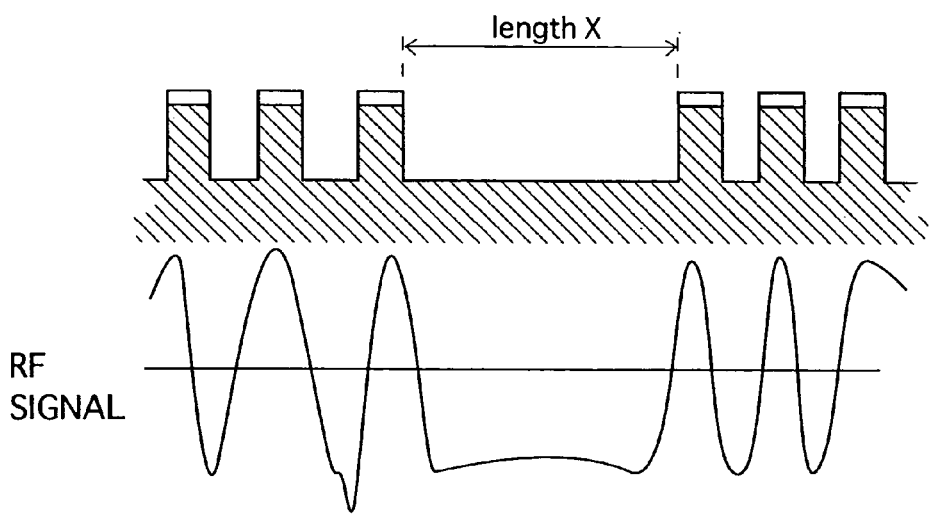
FIG. 11A shows an RF signal obtained by reading a track having the track shape shown in FIG. 10A.

Since the concave pit has the length X in FIG. 10A, an RF signal obtained from this pit becomes a long low section, in comparison with an RF signal obtained from a normal concave pit. FIG. 11A shows the RF signal obtained when the concave pit shown in FIG. 10A is read. As shown in this drawing, the RF signal includes a low section that is longer than any normal low section. Especially note that the RF signal having this waveform cannot be reproduced and written by commercially available reproduction apparatus and recording apparatus. This is because the commercially available reproduction apparatus reads concave pits and convex pits having a length 3T–14T from an optical disc and the commercially available recording apparatus records concave pits and convex pits having a length 3T–14T on a rewritable disc. When an RF signal is obtained from a concave pit having a length X, the commercially available reproduction apparatus and recording apparatus regards the RF signal as an irregular RF signal and converts it into a regular RF signal by performing error correction processing during reproduction and recording. As a result, the concave pit having the length X is not copied to a rewritable disc by casual copying. The presence of such a concave pit on an optical disc certifies that the optical disc is a legitimate optical disc produced by an authorized manufacturer. This concave pit having the length X is referred to as a "disc identifier" in this embodiment. A reproduction apparatus of the present embodiment generates an RF signal by reading a disc identifier from an optical disc to be reproduced, and checks how long a low section of the RF signal continues. According to the check result, the reproduction apparatus judges whether the optical disc to be reproduced is a legitimate optical disc or an illegitimate rewritable disc to which a digital copyrighted material is illegally copied by casual copying.

FIG. 10B shows a track shape where a pit string including concave pits and convex pits has a length X and a reflection layer is removed from the convex pits. Here, it does not matter whether the reflection layer in the concave pits remains or is completely melted. Because the reflection layer is removed from the convex pits as described above, the waveform of an RF signal obtained from the pit string shown in FIG. 10B becomes the same as that of the RF signal obtained from the concave pit shown in FIG. 10A. That is, the RF signal obtained from this pit string has a long low section, in comparison with an RF signal obtained from a normal pit string. Because the low section is longer than any normal low section, the track shape shown in FIG. 10B is also usable as a disc identifier.

FIG. 10C shows a track shape where a reflection layer having a length of at least 3T remains on a specific convex pit that is located in the middle of the processed area. The total length of concave pits and convex pits on the left side of the specific convex pit is x1 and that of concave pits and convex pits on the right side of the specific convex pit is x2. Because each of the lengths x1 and x2 is smaller than the length X as shown in FIG. 10C, the pit string on each side of the specific convex pit is regarded as a concave pit having a length less than X.

Figure 11B:
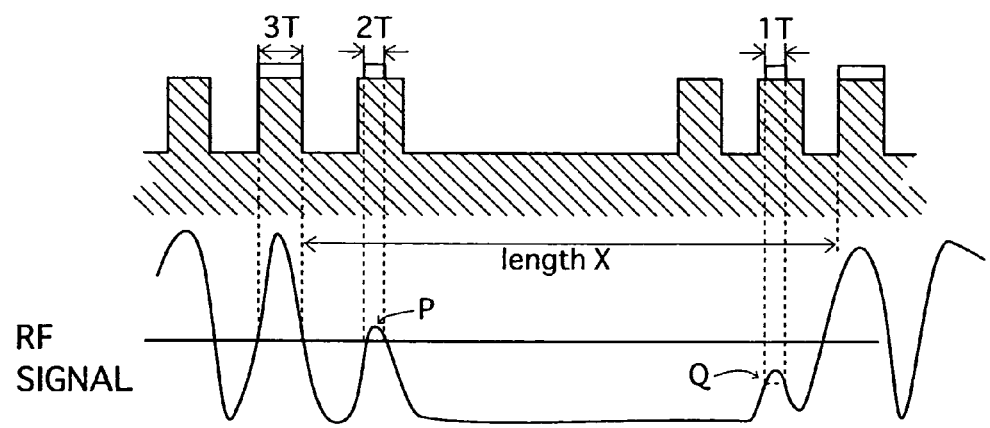
FIG. 11B shows an RF signal obtained by reading a track having the track shape shown in FIG. 10D.

FIG. 10D shows a track shape where a reflection layer having a length less than 2T remains on specific convex pits in the processed area. Like the cases of FIGS. 10A and 10B, an RF signal obtained from the pit string having this shape includes a long low section, in comparison with an RF signal obtained from a normal pit string. In the case of FIG. 10D, however, a reflection layer of 1T or 2T exists on the specific convex pits. Therefore, the RF signal obtained from this processed area includes peaks corresponding to the reflection layer of 1T and 2T. FIG. 11B shows the RF signal obtained when the track having the shape shown in FIG. 10D is read. In this drawing, the RF signal includes peaks P and Q corresponding to the reflection layer of 1T and 2T. If the peak P is detected during reproduction, there may be a case where the pit string in this processed area is not regarded as a concave pit having a length X and is erroneously dealt with as a pit string, such as the pit strings in FIG. 10C, having a length less than X.

Figure 12A:
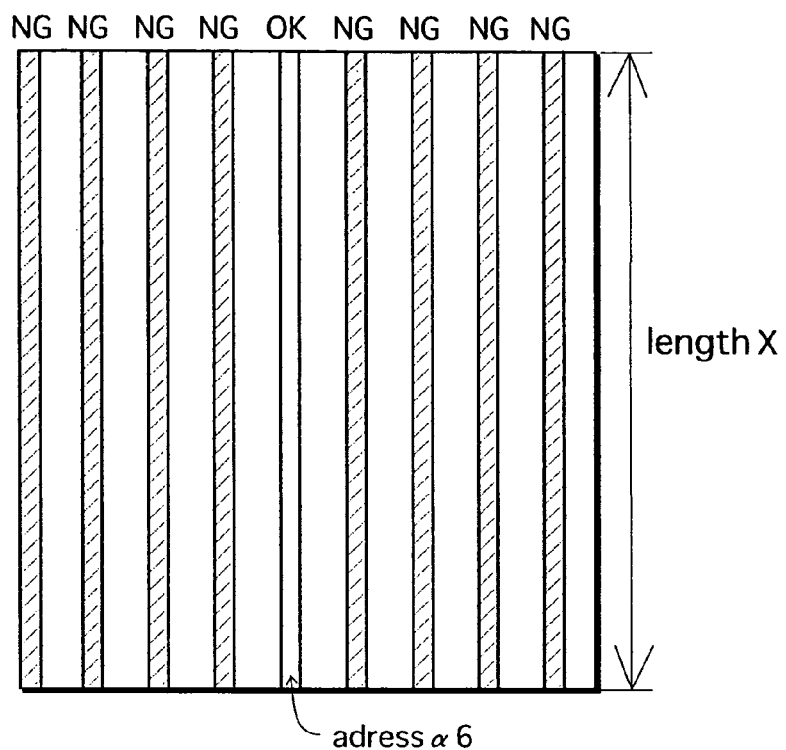
FIG. 12A shows how a track is selected as a disc identifier from tracks in the processed area shown in FIG. 9.

As described above, the track shown in FIG. 10D may be confused with a track shown in FIG. 10C during reproduction. Therefore, the track shown in FIG. 10D is not usable as a disc identifier. FIG. 12A shows how a disc identifier is distinguished from tracks in the processed area shown in FIG. 9. Among Y tracks in the processed area, a track that has the length X and starts from an address α6 has the track shape shown in FIG. 10A or FIG. 10B and other tracks have the track shapes shown in FIGS. 10C and 10D. Therefore, the track that has the length X and starts from the address α6 is regarded as a disc identifier.

Figure 12B:
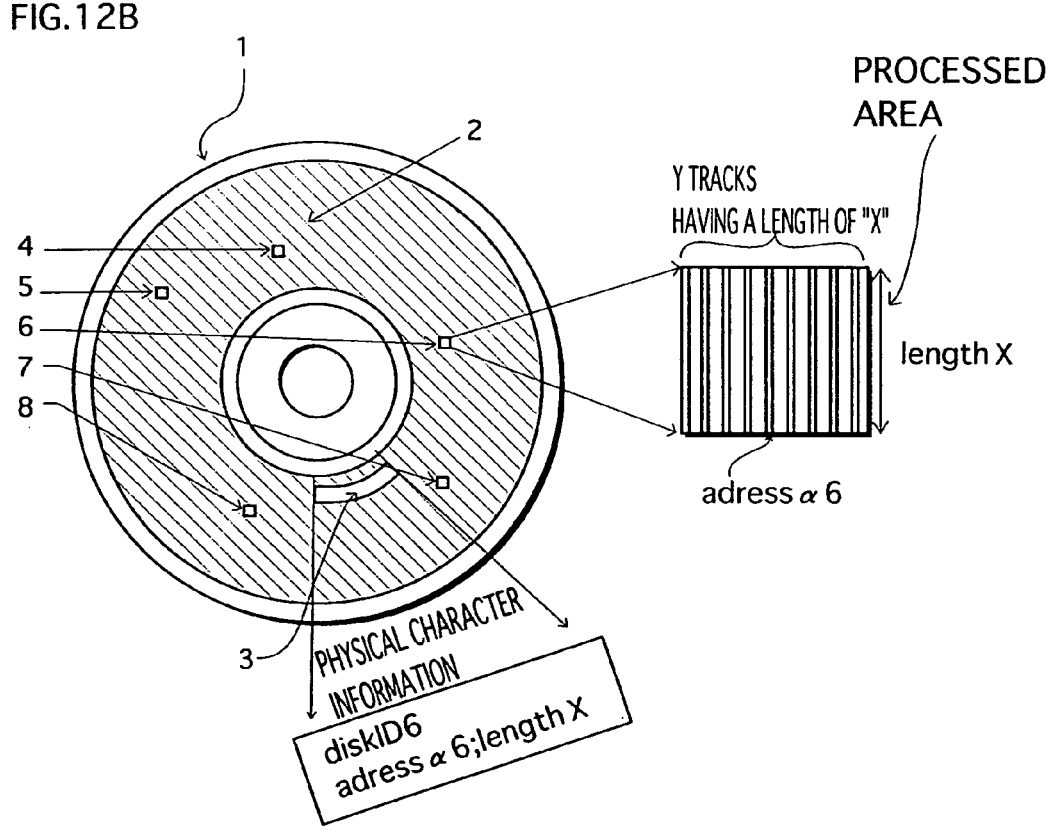
FIG. 12B shows a specific area in which physical character information concerning the selected track is recorded.

The processed area has been described above. The following description concerns the specific area 3. The specific area 3 records physical character information showing the position and length of the track, which is recorded as a disc identifier, out of the Y tracks in the processed area. FIG. 12B shows the specific area 3 that records physical character information corresponding to the processed area shown in FIG. 12A. As shown in FIG. 12B, the specific area 3 records physical character information showing the address (α6) and the length (X) of the track that is the disc identifier. Because the specific area 3 records the physical character information concerning the track having the shape shown in FIG. 10A or FIG. 10B, a legitimate reproduction apparatus to reproduce the optical disc finds the location of the disc identifier on the optical disc by referring to the physical character information. Also, because the physical character information shows the length of the disc identifier, the legitimate reproduction apparatus recognizes the length of a low section of the RF signal that is generated by reading the disc identifier.

Figure 13:
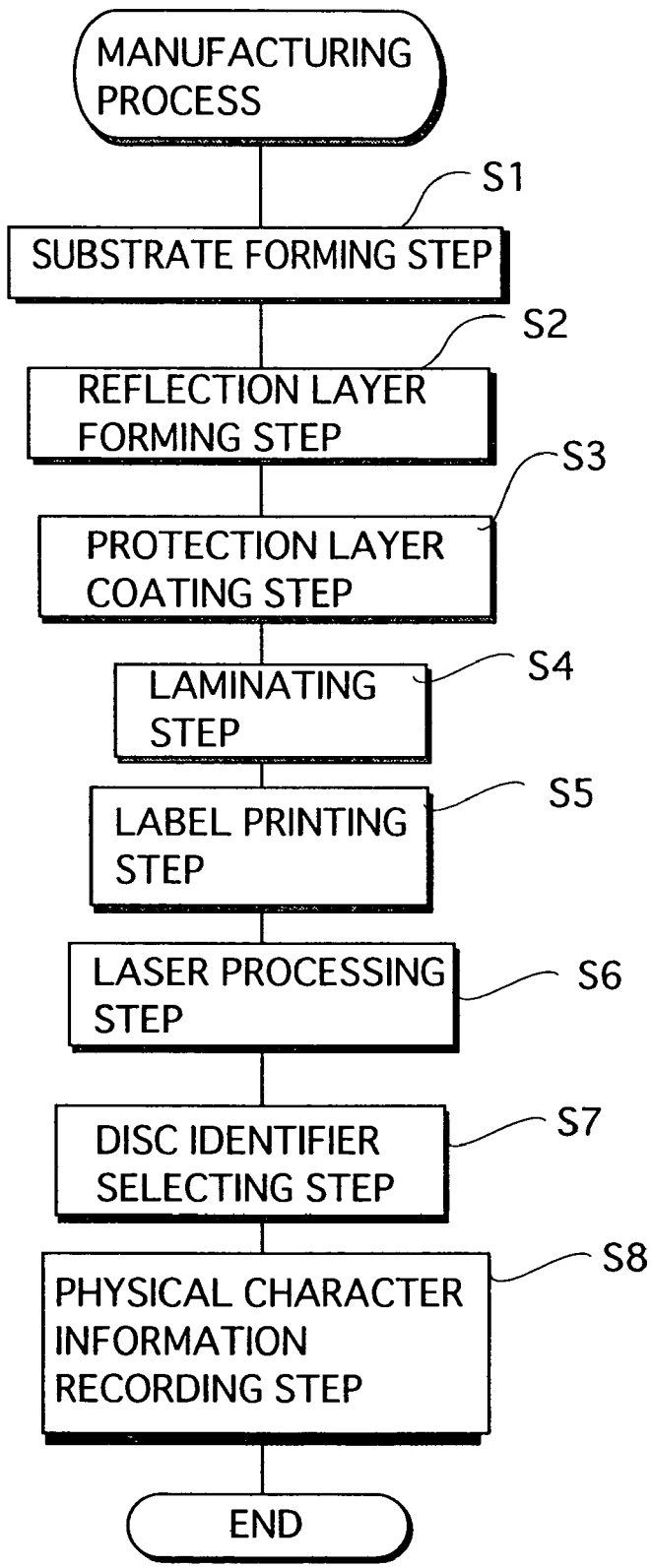
FIG. 13 shows the manufacturing process of an optical disc of the second embodiment.

The optical disc of the second embodiment has been described above. Next, the manufacturing process of the optical disc of the present embodiment is described. FIG. 13 shows the process of manufacturing the present optical disc. The manufacturing process shown in this drawing includes steps S1 (substrate forming step), S2 (reflection layer forming step), S3 (protection layer coating step), S4 (laminating step), and S5 (label printing step) that are conventionally performed during the manufacturing of an optical disc. Steps S6 (laser processing step), S7 (disc identifier selecting step), and S8 (physical character information recording step) are unique to the present manufacturing process.

In S6 (laser processing step), N processed areas are formed by irradiating a YAG laser onto an optical disc.

In S7 (disc identifier selecting step), a disc identifier is selected from each processed area formed by the irradiation of the YAG laser and physical character information showing the length and location of the selected disc identifier is generated.

In S8 (physical character information recording step), the physical character information generated in S7 is recorded in the specific area 3.

Figure 14:
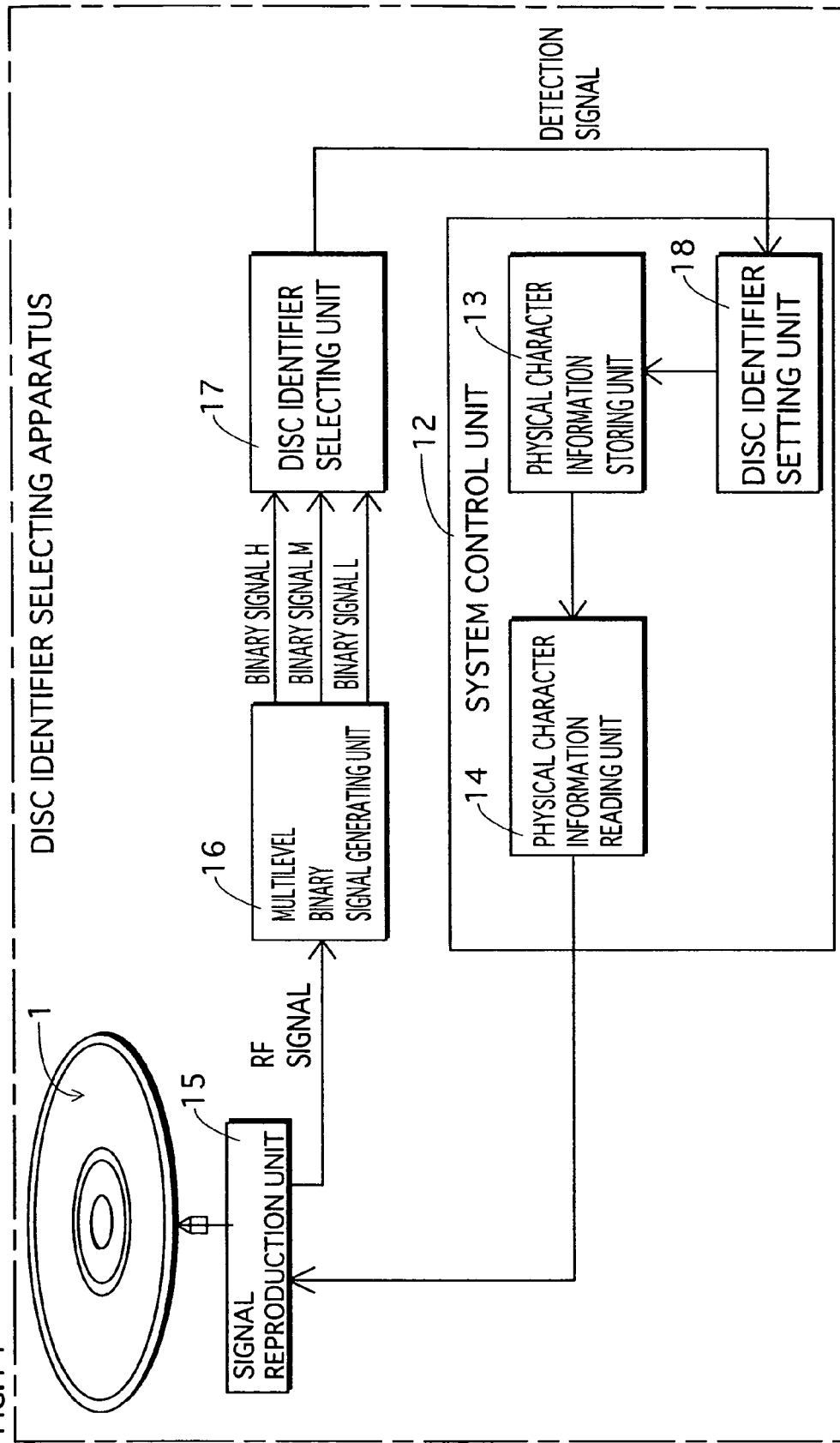
FIG. 14 shows the internal construction of a disc identifier selecting apparatus.

The laser processing step (S6) for forming processed areas by the irradiation of the YAG laser and the physical character information recording step (S8) for recording a disc identifier in the specific area 3 can be carried out by an existing optical disc manufacturing facility. The disc identifier selecting step (S7) is carried out by a disc identifier selecting apparatus shown in FIG. 14. The following is a description concerning the disc identifier selecting apparatus. As shown in FIG. 14, the disc identifier selecting apparatus includes a system control unit 12 (including a physical character information storing unit 13, a physical character information reading unit 14, and a disc identifier setting unit 18), a signal reproduction unit 15, a multilevel binary signal generating unit 16, and a disc identifier selecting unit 17.

The system control unit 12 includes a CPU, a memory, and a program stored in the memory, and takes overall control of the disc identifier selecting apparatus.

The physical character information storing unit 13 stores a physical character information table that gives each piece of physical character information showing the location and length of one of Y tracks in N processed areas. FIG. 15A shows an example of the physical character information table. The physical character information table includes a physical character information column and a OK/NG column. The physical character information column gives each piece of physical character information showing the start address and length of one of Y tracks in N processed areas. The OK/NG column gives a sign (OK/NG) for each track to show whether the track is usable as a disc identifier.

The physical character information reading unit 14 instructs the signal reproduction unit 15 to read each track (pit string) in the N processed areas according to the physical character information table stored in the physical character information storing unit 13.

The signal reproduction unit 15 obtains an RF signal by reading each track according to the position and length of the track informed by the physical character information reading unit 14.

Figure 17A:
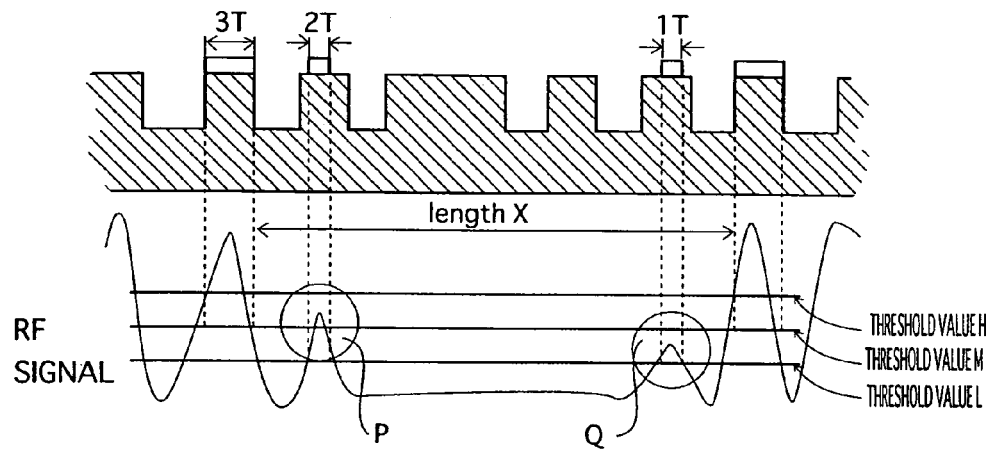
FIG. 17A shows examples of threshold values M, L, and H that are set for a pit string having the track shape shown in FIG. 10D.

The multilevel binary signal generating unit 16 converts the RF signal sent from the signal reproduction unit 15 into a binary signal using threshold values M, L, and H, and outputs three binary signals M, L, and H. FIG. 17A shows examples of these threshold values that are set for the concave pits and convex pits having the track shape shown in FIG. 10D.

The disc identifier selecting unit 17 judges whether the read track has a track shape shown in FIG. 10A or FIG. 10B according to the binary signals M, L, and H output from the multilevel binary signal generating unit 16. If the read track has the track shape shown in FIG. 10A or FIG. 10B, the disc identifier selecting unit 17 outputs a detection signal to the disc identifier setting unit 18.

The disc identifier setting unit 18 sets the sign OK for each piece of physical character information corresponding to a track that is judged as having the track shape shown in FIG. 10A or FIG. 10B. The disc identifier setting unit 18 also sets the sign NG for each piece of physical character information corresponding to a track that is judged as having the track shape shown in FIG. 10C or FIG. 10D. FIG. 15B shows an example state where the disc identifier setting unit 18 has set the sign OK/NG for each piece of physical character information.

Next, the internal construction of the multilevel binary signal generating unit 16 is described. FIG. 16A shows the internal construction of the multilevel binary signal generating unit 16. As shown in this drawing, the multilevel binary signal generating unit 16 includes three comparators 21–23.

Figure 17B:
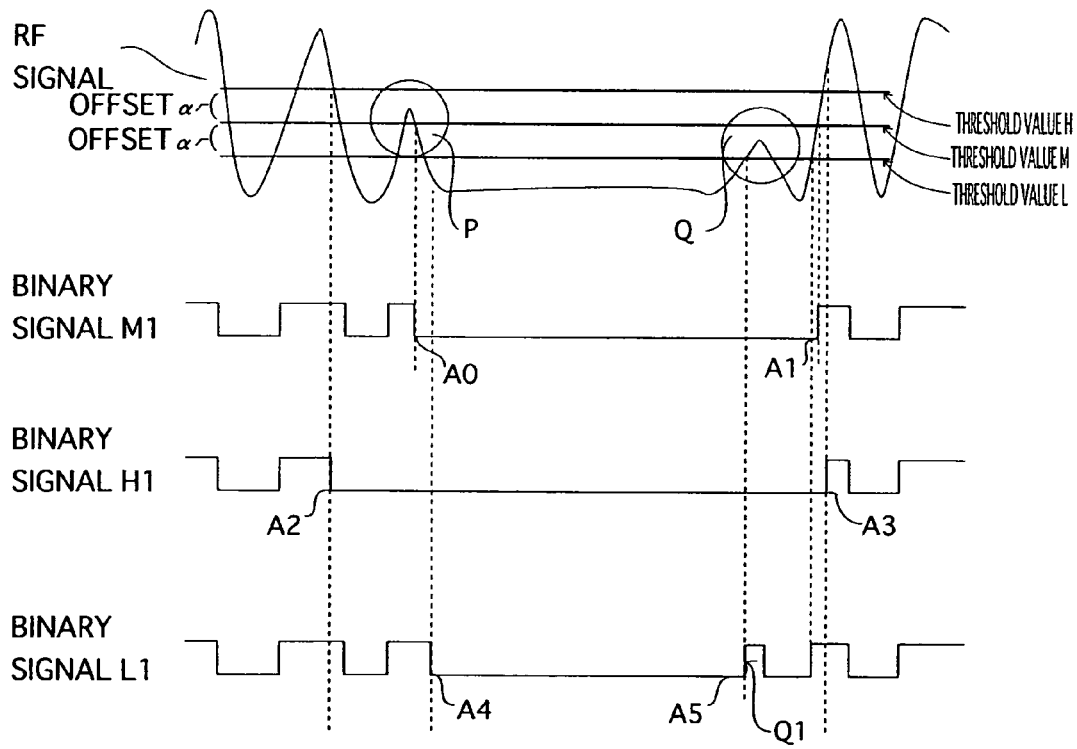
FIG. 17B shows an RF signal and three binary signals M, H, and L.

The comparator 21 generates a binary signal M1 from an RF signal using a threshold value M that is set at the center of the amplitude variation range of the RF signal and outputs the binary signal M1. Here, the reason why the threshold value is set with reference to the amplitude variation range of the RF signal is that the level of a reflection light from a pit string varies according to the type of an optical pickup used to read the pit string. The first level in FIG. 17B shows an example of the threshold value M that is set for the RF signal. The second level in FIG. 17B shows the binary signal M1 generated by the comparator 21 from the RF signal. Note that the threshold value M may be preset at a fixed value.

The comparator 22 generates a binary signal L1 from the RF signal using a threshold value L and outputs the binary signal L1. The first level in FIG. 17B shows an example the threshold value L that is set for the RF signal. As can be seen from this drawing, the threshold value L is obtained by subtracting an offset α from the threshold value M. Because the peak Q is lower than the threshold value M, this peak is not converted into a binary signal with the threshold value M. However, because the peak Q is higher than the threshold value L, this peak is converted into a binary signal with the threshold value L. The fourth level in FIG. 17B shows the binary signal L1 generated by the comparator 22 from the RF signal. As can be seen from this drawing, the binary signal L1 includes a pulse wave Q1 that is obtained by the conversion of the peak Q into the binary signal L1.

The comparator 23 generates a binary signal H1 from the RF signal using a threshold value H and outputs the binary signal H1. The first level in FIG. 17B shows an example of the threshold value H that is set for the RF signal. As can be seen from this drawing, the threshold value H is obtained by adding the offset α to the threshold value M. Therefore, although being converted into a binary signal with the threshold value M, the peak P is not converted into a binary signal with the threshold value H. The third level in FIG. 17B shows the binary signal H1 generated by the comparator 23 from the RF signal. As can be seen from the second, third, and fourth levels in FIG. 17B, the binary signal M1 includes a low section sandwiched between points A0 and A1, the binary signal H1 includes a low section sandwiched between points A2 and A3, and the binary signal L1 includes a low section sandwiched between points A4 and A5. Therefore, the low section included in the binary signal M1 is shorter than that included in the binary signal H1, but is longer than that included in the binary signal L1.

Figure 18:
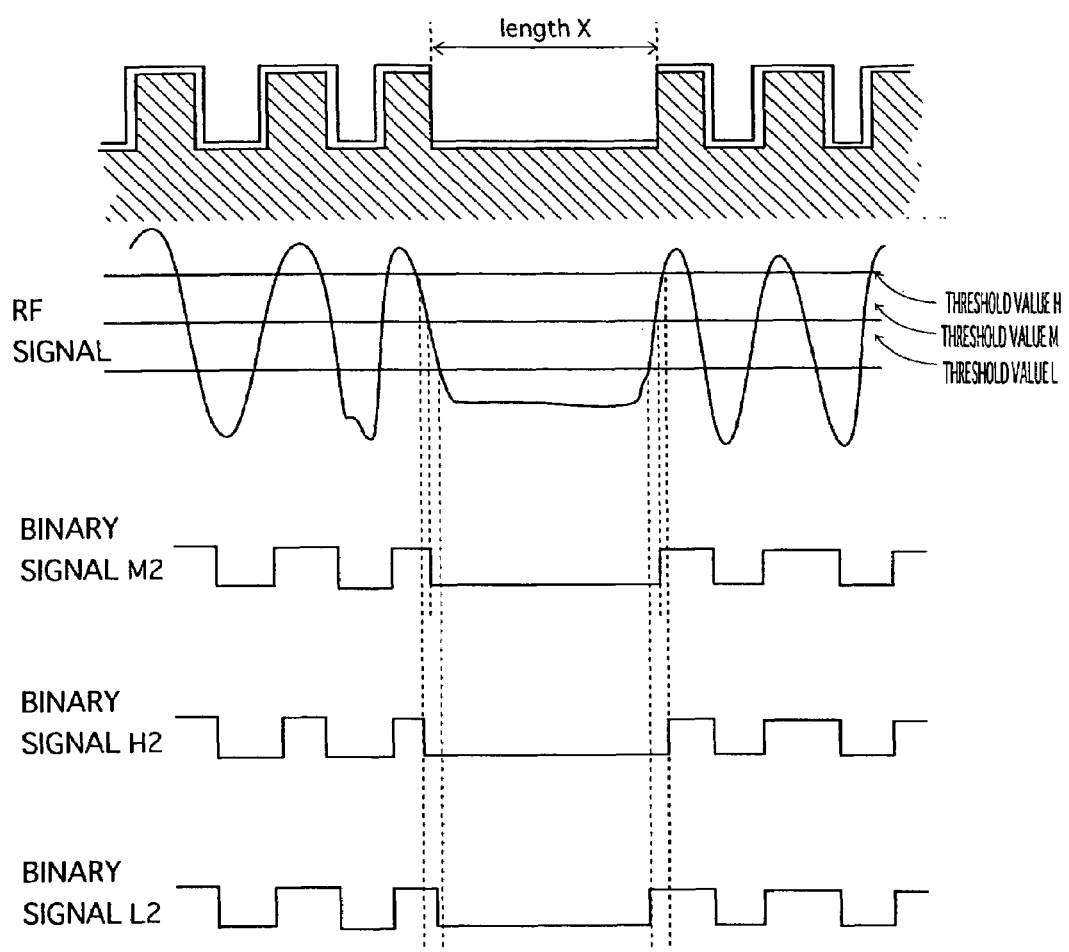
FIG. 18 shows an RF signal generated when a pit string having the track shape shown in FIG. 10A

FIG. 18 shows the RF signal generated when a track having the track shape shown in FIG. 10A or FIG. 10B is read by an optical pickup. The RF signal shown in FIG. 18 does not include the peaks P and Q, unlike the RF signal shown in FIG. 17B. Therefore, if binary signals are generated from the RF signal shown in FIG. 18 using the threshold values M, L, and H, the binary signals M2, L2, and H2 have similar wave forms.

As can be seen from this, although the binary signals M1, L1, and H1 that are generated from the RF signal obtained by reading the track having the shape shown in FIG. 10D include low sections having different lengths, the binary signals M2, L2, and H2 that are generated from the RF signal obtained by reading the track having the shape shown in FIG. 10A or FIG. 10B include low sections having similar lengths.

The following description concerns the internal construction of the disc identifier selecting unit 17. FIG. 16B shows the internal construction of the disc identifier selecting unit 17. As shown in this drawing, the disc identifier selecting unit 17 includes counters 31 and 32 and comparators 33 and 34.

The counter 31 counts the length of the low section of a binary signal H (H1 or H2) and outputs a count value x.

The counter 32 counts the length of the low section of a binary signal L (L1 or L2) and outputs a count value y.

The comparator 33 compares the count values x and y with the maximum length 14T of normal pits. If both of the count values x and y exceed the maximum length, the comparator 33 outputs a detection signal to the comparator 34.

The comparator 34 judges, if receiving the detection signal from the comparator 33, whether the difference x−y between the count values x and y exceeds a predetermined threshold value. In the case of the binary signals H2 and L2 generated from the RF signal shown in FIG. 18 that does not include the peaks P and Q, these signals H2 and L2 include low sections having similar lengths. Therefore, the count values x and y are similar to each other and the difference x−y does not exceed the predetermined threshold value.

In the case of the binary signals H1 and L1 generated from the RF signal shown in FIG. 17B that includes the peaks P and Q, these signals H1 and L1 include low sections having profoundly different lengths. Therefore, in this case, the difference x−y exceeds the predetermined threshold value. If the difference x−y does not exceed the predetermined threshold value, the comparator 34 outputs a detection signal showing that the track has a shape shown in FIG. 10A or FIG. 10B. On the other hand, if the difference x−y exceeds the predetermined threshold value, the comparator 34 outputs a detection signal showing that the track has a shape shown in FIG. 10D. By repeatedly performing the processing described above for each of the Y tracks in the processed area, only a track having the shape shown in FIG. 10A or FIG. 10B is selected and physical character information showing the location and length of the selected track is recorded in the specific area 3 in the physical character information recording step. In this manner, only a track having the shape shown in FIG. 10A or FIG. 10B is selected as a disc identifier (tracks having the shape shown in FIG. 10D are not selected). This ensures that the disc identifier is detected with stability during reproduction.

Figure 19A:
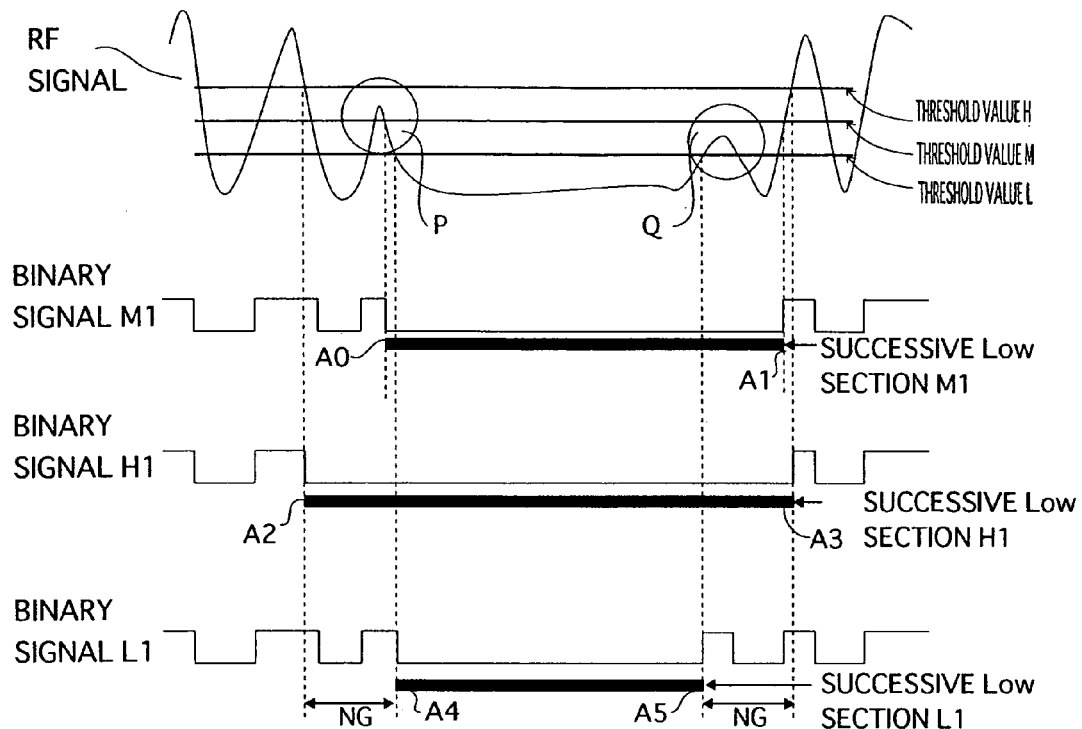
FIG. 19A shows a low section included in each binary signal shown in FIG. 17B.
Figure 19B:
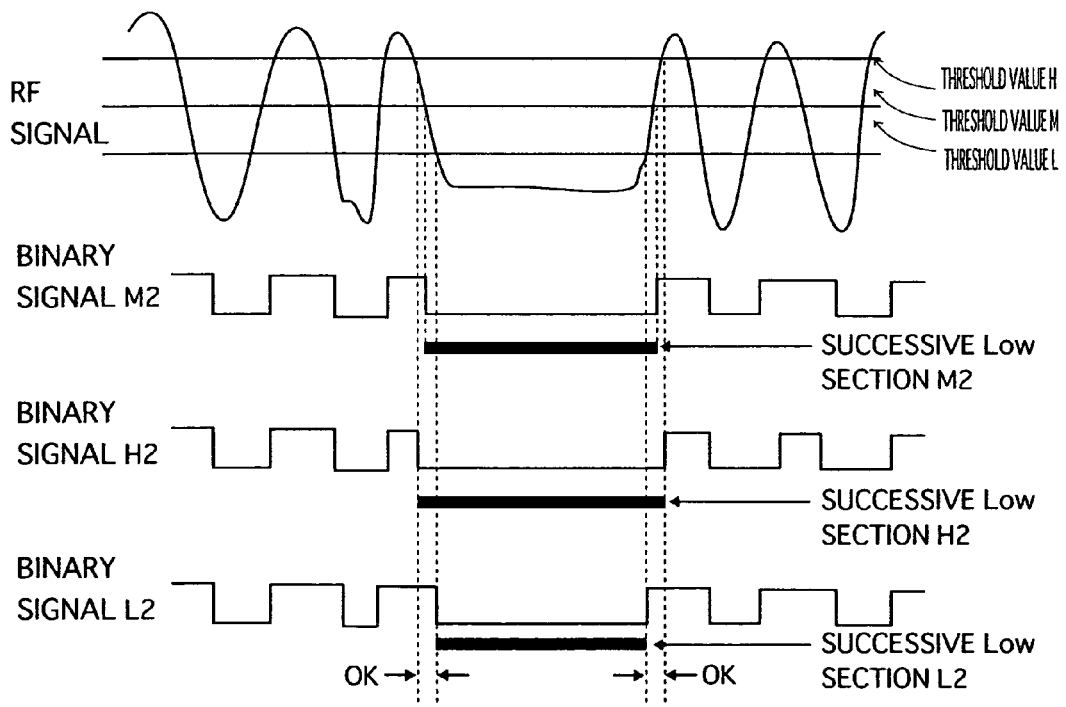
FIG. 19B shows a low section included in each binary signal shown in FIG. 18.

FIG. 19A shows the low section of each of the binary signals M1, H1, and L1 shown in FIG. 17B, while FIG. 19B shows the low section of each of the binary signals M2, H2, and L2 shown in FIG. 18. The counters 31 and 32 count the lengths of the low sections of these binary signals (shown with bold lines in these drawings) and the comparator 34 compares the difference x−y between the counted lengths with the predetermined threshold value.

The following is a description concerning a reproduction apparatus of the present embodiment. FIG. 20 shows the internal construction of this reproduction apparatus. As shown in this drawing, the reproduction apparatus includes a system control unit 40 (including a physical character information reading unit 41 and a number judging unit 47), a signal reproduction unit 42, a single level binary signal generating unit 43, a counter 44, a comparator 45, and a counter 46.

The system control unit 40 includes a CPU, a memory, and a program stored in the memory, and takes overall control of the reproduction apparatus.

The physical character information reading unit 41 operates as follows when an optical disc is placed in the reproduction apparatus and an instruction to reproduce the optical disc is inputted. The physical character information reading unit 41 reads n pieces of physical character information from the specific area 3 and informs the signal reproduction unit 42 of the location and length shown by each piece of physical character information.

The signal reproduction unit 42 obtains an RF signal by reading tracks according to the locations and lengths informed by the physical character information reading unit 41.

The single level binary signal generating unit 43 generates a binary signal M from the RF signal sent from the signal reproduction unit 42 using a single threshold value M. The single level binary signal generating unit 43 then outputs the binary signal M to the counter 44.

The counter 44 counts the length of each low section of the binary signal M output from the single level binary signal generating unit 43.

The comparator 45 judges whether the length of each low section counted by the counter 44 is the same as that shown by one of the N pieces of physical character information and, if so, outputs a detection signal to the counter 46.

The counter 46 counts the number M of the detection signals output from the comparator 45.

The number judging unit 47 calculates a ratio M/N between the total number N of pieces of physical character information in the specific area and the number M counted by the counter 46. The number judging unit 59 then compares the ratio M/N with a predetermined threshold value. If the ratio M/N exceeds the predetermined threshold value, the reproduction of the optical disc is allowed. If the ratio M/N does not exceed the predetermined threshold value, the reproduction of the optical disc is prohibited. Accordingly, even if the content of a legitimate optical disc is copied to a rewritable disc by casual copying and the rewritable disc is placed in the reproduction apparatus, the reproduction apparatus does not reproduce the rewritable disc.

As described above, a disc identifier of the optical disc of the present embodiment is recorded as a concave pit or a pit string having a length at least equal to 15T. Therefore, commercially available reproduction apparatus and recording apparatus cannot reproduce and record the disc identifier. The reproduction apparatus of the present embodiment judges whether an optical disc placed therein includes a disc identifier to determine whether the optical disc is a legitimate optical disc on which a digital copyrighted material has been recorded by an authorized manufacturer or an illegitimate rewritable disc on which a digital copyrighted material has been recorded by casual copying.

Figure 21:
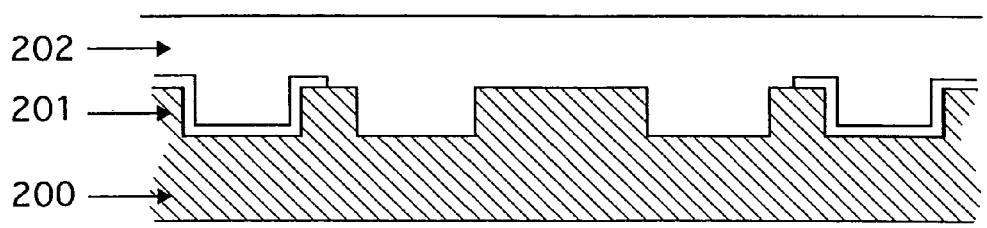
FIG. 21 shows convex pits, on each of which a reflection layer having a length 1T–2T remains.

It should be noted here that a disc identifier may be convex pits, on each of which a reflection layer of 1T–2T remains, as shown in FIG. 21. The RF signal obtained from these pits by the irradiation of laser light does not have a enough amplitude level. Therefore, whether an optical disc to be reproduced is legitimate can be judged by processing the RF signal using a threshold value L.

Figure 22A:
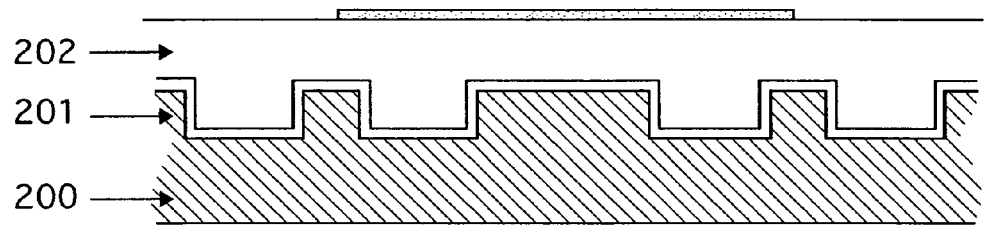
FIG. 22A shows a pit string on which a low reflection material has been applied.
Figure 22B:
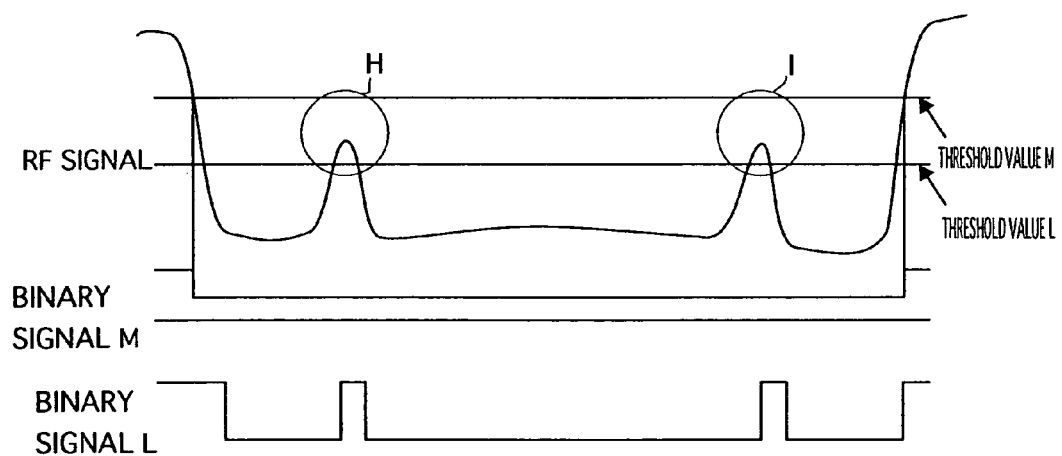
FIG. 22B shows an RF signal that includes peaks H and I, each of which does not have an enough amplitude level.

Also, as shown in FIG. 22A, a disc identifier may be recorded by applying a low reflection material on a certain disc surface area to suppress the amount of reflection light from a pit string under the disc surface area. In this case, the amount of reflection light from the pit string becomes insufficient during the reading of both ends of the pit string with laser light, so that the RF signal corresponding to these ends does not have a high enough amplitude level. Also, if the surface of a disc vibrates during reproduction, variations are generated in the binary signal generated from the RF signal. FIG. 22B shows an RF signal that includes peaks H and I, each of which does not have a high enough amplitude level. Because the peaks H and I correspond to the ends of the pit string under the certain disc surface area, these peaks are converted into a binary signal L using the threshold value L that is lower than the threshold value M. Then, it is judged whether the optical disc to be reproduced is legitimate by detecting pulses of the binary signal L that correspond to the peaks H and I.

<Third Embodiment>

The present embodiment relates to a technique in which threshold value setting information is recorded along with physical character information in the specific area 3. The threshold value setting information shows that a reproduction apparatus of the present embodiment needs to change the threshold value M to the threshold value L. Here, like the above embodiments, the threshold value L is lower than the threshold value M. The reproduction apparatus reads the threshold value setting information along with the N pieces of physical character information from the specific area 3. The reproduction apparatus then changes the threshold value M to the threshold value L before reading each pit string corresponding to one of the N pieces of physical character information. After each corresponding pit string is read, the reproduction apparatus returns the threshold value L to the threshold value M. FIGS. 23 and 24 respectively show states before and after the threshold value M is changed to the threshold value L. As is apparent from these drawings, peaks E, F, and G, each of which does not have a high enough amplitude level, can be detected by changing the threshold value M to the threshold value L.

As described above, in the present embodiment, a disc identifier can be detected with stability by changing the threshold value M to the threshold value L. As a result, the reproduction apparatus of the present embodiment does not need to use a plurality of comparators.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. An optical disc comprising:
   a processed area that has been processed with a laser,
   wherein an area of the optical disc other than the processed area includes concave parts and convex parts, each of which has a length within a range from a first length to a second length and is coated with a reflection layer, and
   the processed area includes a first concave part or a first pit string, the first concave part having a length exceeding the second length, and the first pit string having a length exceeding the second length and including concave parts and uncoated convex parts from which the reflection layer is removed.

2. The optical disc of claim 1 further comprising a specific area,
   wherein the processed area further includes a second pit string that has a length exceeding the second length and includes a convex part on which a reflection layer having a length less than the first length exists,
   the first concave part or the first pit string is distinguished from the second pit string by comparing a level of an RF signal obtained from the processed area with a first threshold value and a second threshold value, and
   the specific area records information showing a location and a length of the first concave part or the first pit string.

3. The optical disc of claim 2,
   wherein an RF signal obtained from the second pit string has a level that remains above the first threshold value but below the second threshold value, and
   an RF signal obtained from the first concave part or the first pit string has a level that remains below both of the first threshold value and the second threshold value,
   wherein the first threshold value is obtained by subtracting a predetermined offset from a certain threshold value used to convert an RF signal into a binary signal, and
   the second threshold value is obtained by adding the predetermined offset to the certain threshold value.

* * * * *